United States Patent
Yoshikaie et al.

(10) Patent No.: US 12,025,810 B2
(45) Date of Patent: Jul. 2, 2024

(54) IMAGE DISPLAY APPARATUS

(71) Applicant: Sony Corporation, Tokyo (JP)

(72) Inventors: Akira Yoshikaie, Tokyo (JP); Daisuke Ueda, Tokyo (JP)

(73) Assignee: Sony Corporation, Tokyo (JP)

( * ) Notice: Subject to any disclaimer, the term of this patent is extended or adjusted under 35 U.S.C. 154(b) by 883 days.

(21) Appl. No.: 15/733,984

(22) PCT Filed: May 29, 2019

(86) PCT No.: PCT/JP2019/021293
§ 371 (c)(1),
(2) Date: Dec. 1, 2020

(87) PCT Pub. No.: WO2019/235320
PCT Pub. Date: Dec. 12, 2019

(65) Prior Publication Data
US 2021/0215939 A1 Jul. 15, 2021

(30) Foreign Application Priority Data

Jun. 8, 2018 (JP) ................................ 2018-110305
May 7, 2019 (JP) ................................ 2019-087456

(51) Int. Cl.
*G02B 27/01* (2006.01)
*G02C 7/08* (2006.01)

(52) U.S. Cl.
CPC ..... *G02B 27/0179* (2013.01); *G02B 27/0172* (2013.01); *G02C 7/083* (2013.01);
(Continued)

(58) Field of Classification Search
CPC . G02B 27/0179; G02B 27/0172; G02B 7/083
(Continued)

(56) References Cited

U.S. PATENT DOCUMENTS

| 6,134,051 A | 10/2000 | Hayakawa et al. |
| 7,843,638 B2 | 11/2010 | Watanabe et al. |

(Continued)

FOREIGN PATENT DOCUMENTS

| JP | H11-194295 | 7/1999 |
| JP | 2001-264685 A | 9/2001 |

(Continued)

OTHER PUBLICATIONS

Machine Translation of 2010117542 (Year: 2023).*

(Continued)

*Primary Examiner* — Jerry L Brooks
(74) *Attorney, Agent, or Firm* — K&L Gates LLP

(57) ABSTRACT

An image display apparatus (1C) of the present disclosure includes: an image light formation section (30) that outputs image light; a diffractive optical system that includes a first diffractive section (11) including at least one diffractive device and a second diffractive section (12) causing the image light to converge at a pupil position of a viewer, the first diffractive section (11) having a property of correcting a chromatic aberration that occurs at the second diffractive section (12); and a relay optical system (20) disposed closer to the image light formation section (30) than the second diffractive section (12) and relaying the image light to the second diffractive section (12) to correct the chromatic aberration that occurs at the second diffractive section (12).

20 Claims, 30 Drawing Sheets

(52) U.S. Cl.
CPC .......... *G02B 2027/0116* (2013.01); *G02B 2027/0187* (2013.01); *G02C 2202/22* (2013.01)

(58) Field of Classification Search
USPC .......................................... 359/630
See application file for complete search history.

(56) References Cited

U.S. PATENT DOCUMENTS

| | | | |
|---|---|---|---|
| 7,967,437 B2 | 6/2011 | Saito et al. | |
| 9,529,196 B1 | 12/2016 | Sade | |
| 10,001,651 B2 | 6/2018 | Toshiyuki et al. | |
| 10,566,021 B2 | 2/2020 | Noguchi | |
| 2008/0151185 A1* | 6/2008 | Saito .................. | G02B 27/0101 351/206 |
| 2017/0059868 A1 | 3/2017 | Takeda et al. | |
| 2017/0261751 A1* | 9/2017 | Noguchi ............. | G02B 27/0172 |
| 2018/0151194 A1* | 5/2018 | Noguchi ............. | G11B 7/1353 |
| 2018/0348525 A1* | 12/2018 | Kadowaki ........... | G02B 26/101 |

FOREIGN PATENT DOCUMENTS

| | | |
|---|---|---|
| JP | 2008-083539 | 4/2008 |
| JP | 2008-145701 A | 6/2008 |
| JP | 2010-117542 A | 5/2010 |
| JP | 2010117542 A * | 5/2010 |
| JP | 2014228805 A | 12/2014 |
| JP | 2016-170203 A | 9/2016 |
| JP | 2017058400 A | 3/2017 |
| JP | 2017-167181 | 9/2017 |
| JP | 2018054978 A | 4/2018 |
| JP | 2018-087949 | 6/2018 |
| WO | WO2018/031634 A1 | 2/2018 |
| WO | WO2018/043625 A1 | 3/2018 |

OTHER PUBLICATIONS

International Search Report issued in International Patent Application No. PCT/JP2019/021293 on Jul. 23, 2019 and English translation of same. 6 pages.

Written Opinion issued in International Patent Application No. PCT/JP2019/021293 on Jul. 23, 2019. 5 pages.

* cited by examiner

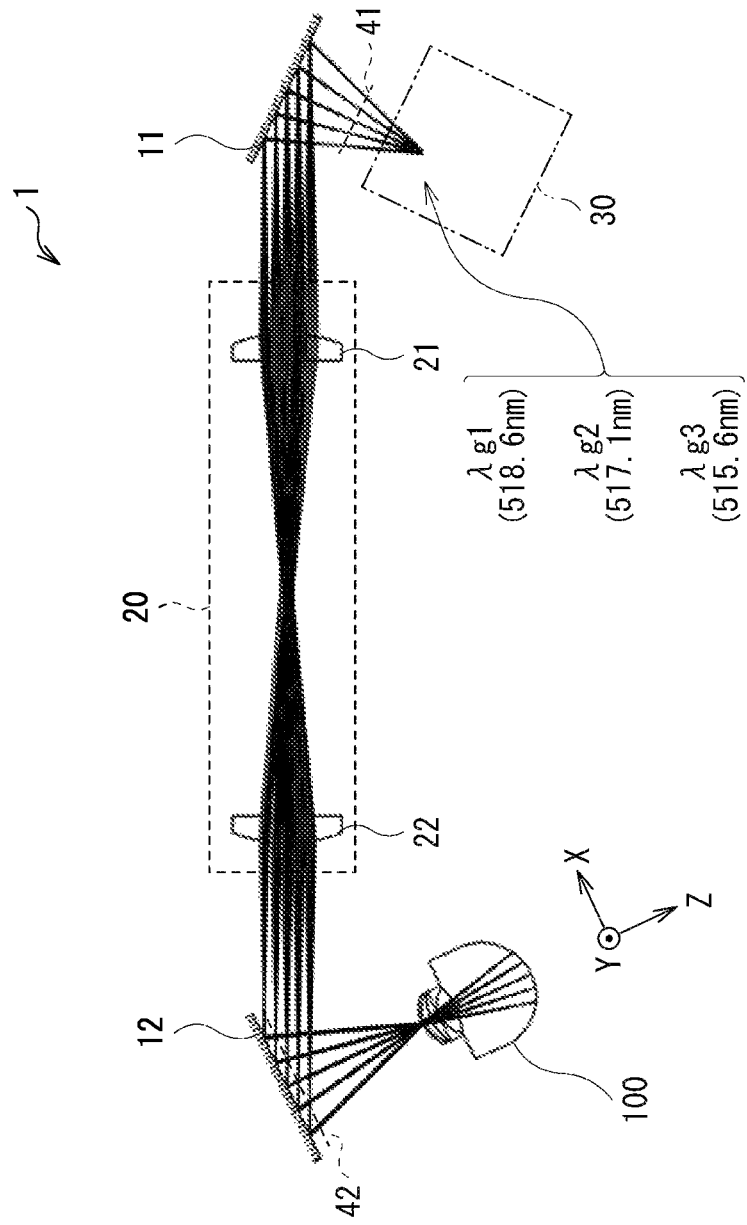
[ FIG. 9 ]

[ FIG. 10 ]
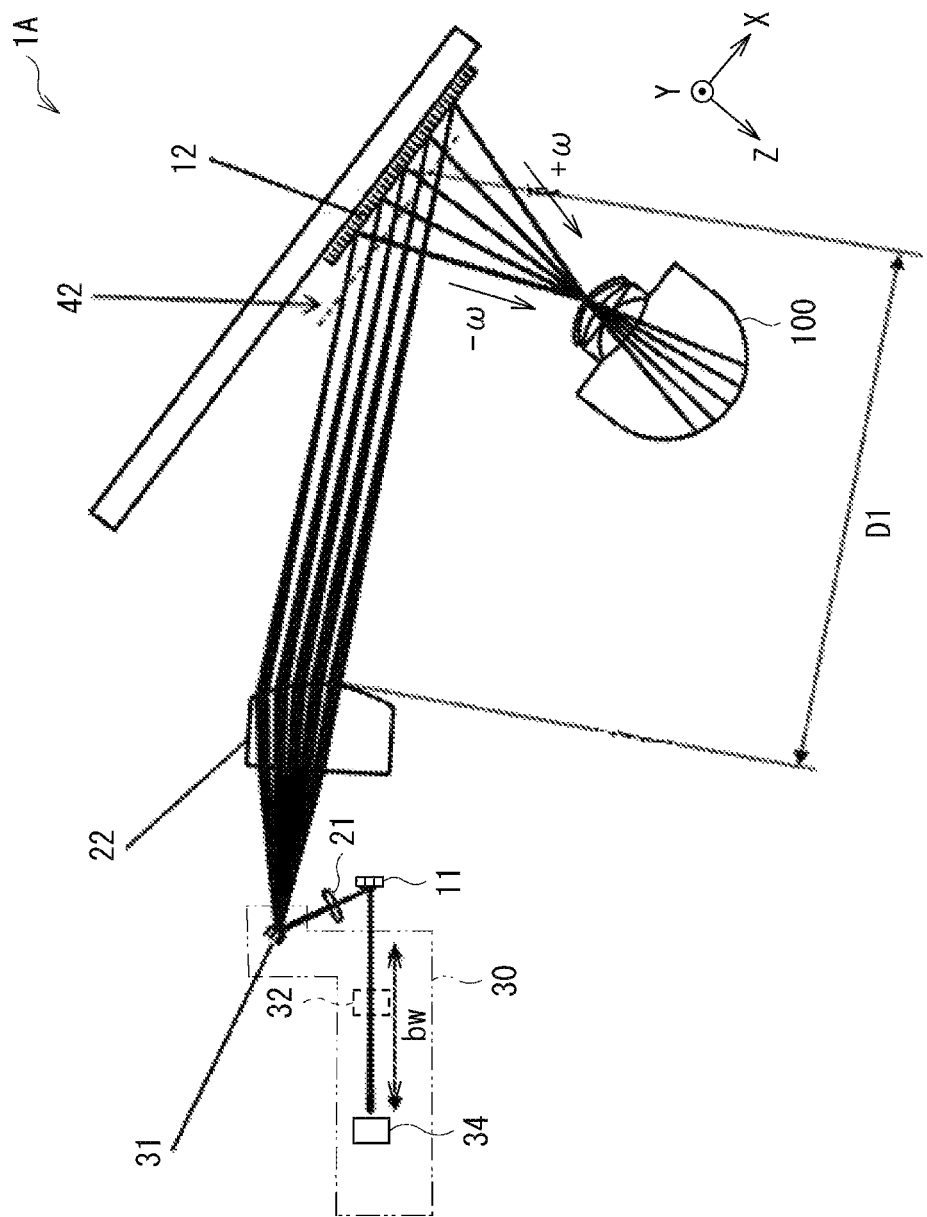

[ FIG. 11 ]
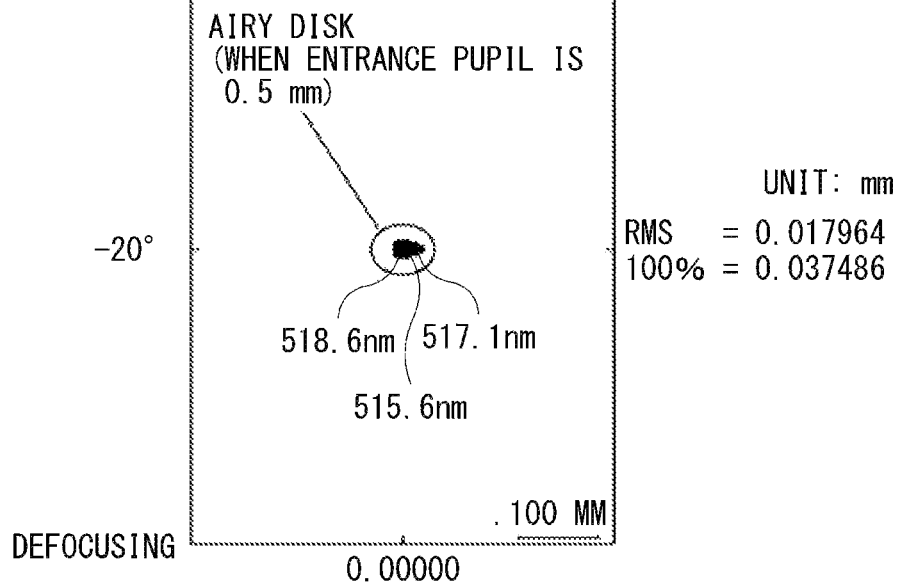
[ FIG. 12 ]
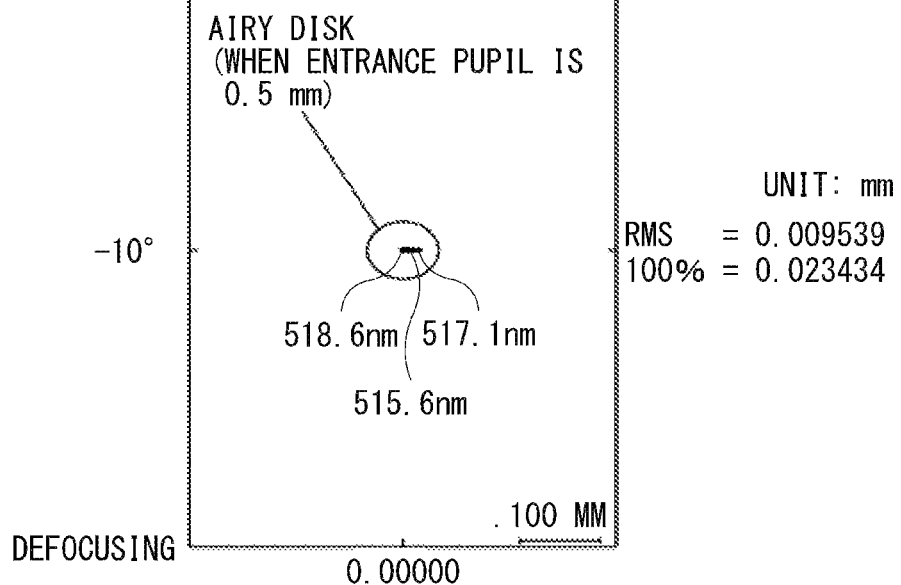

[ FIG. 13 ]
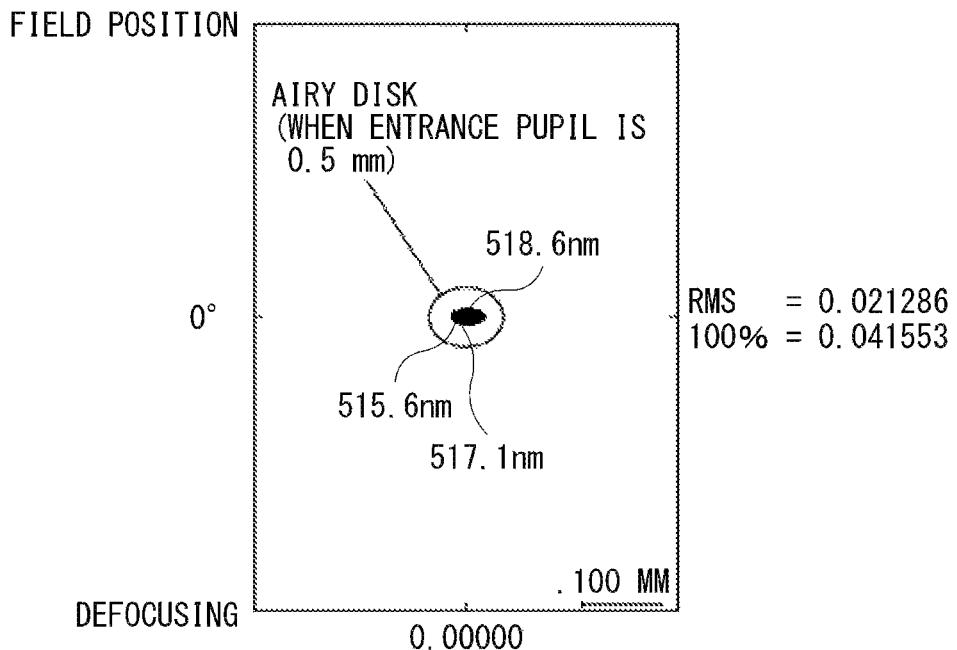
[ FIG. 14 ]
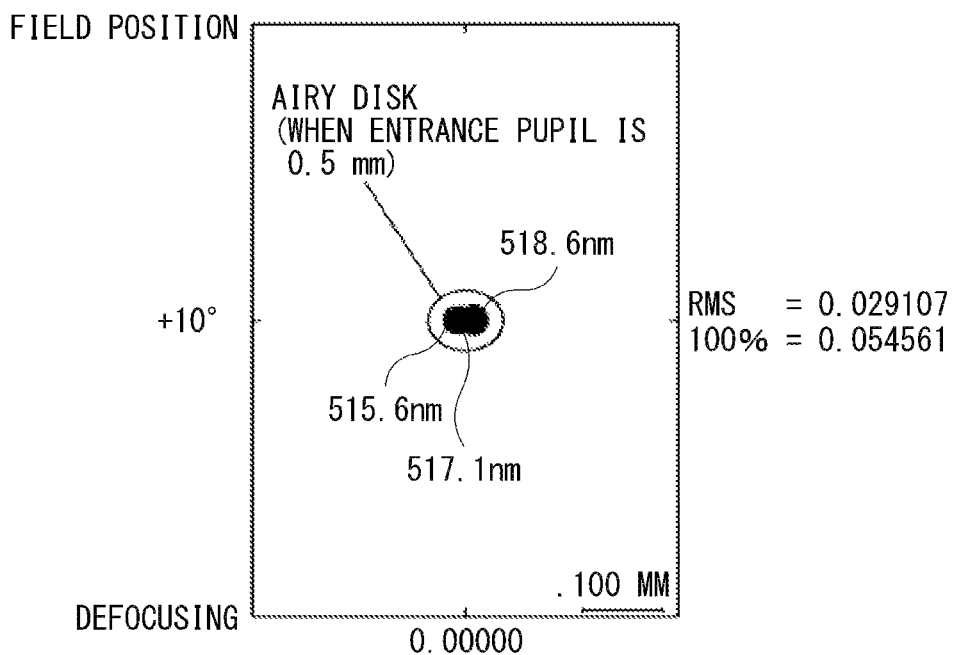

[ FIG. 15 ]
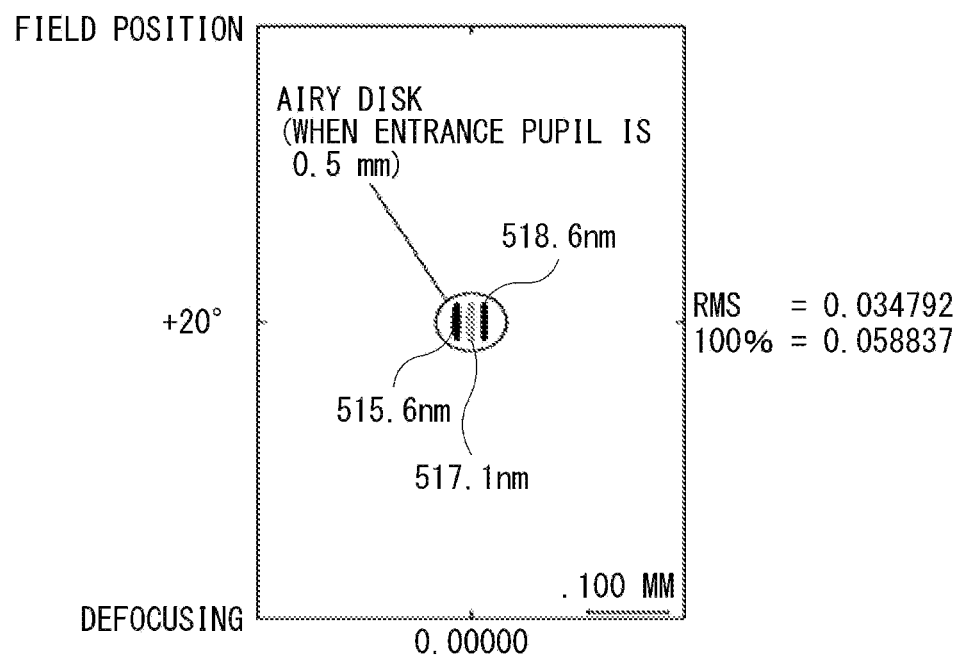

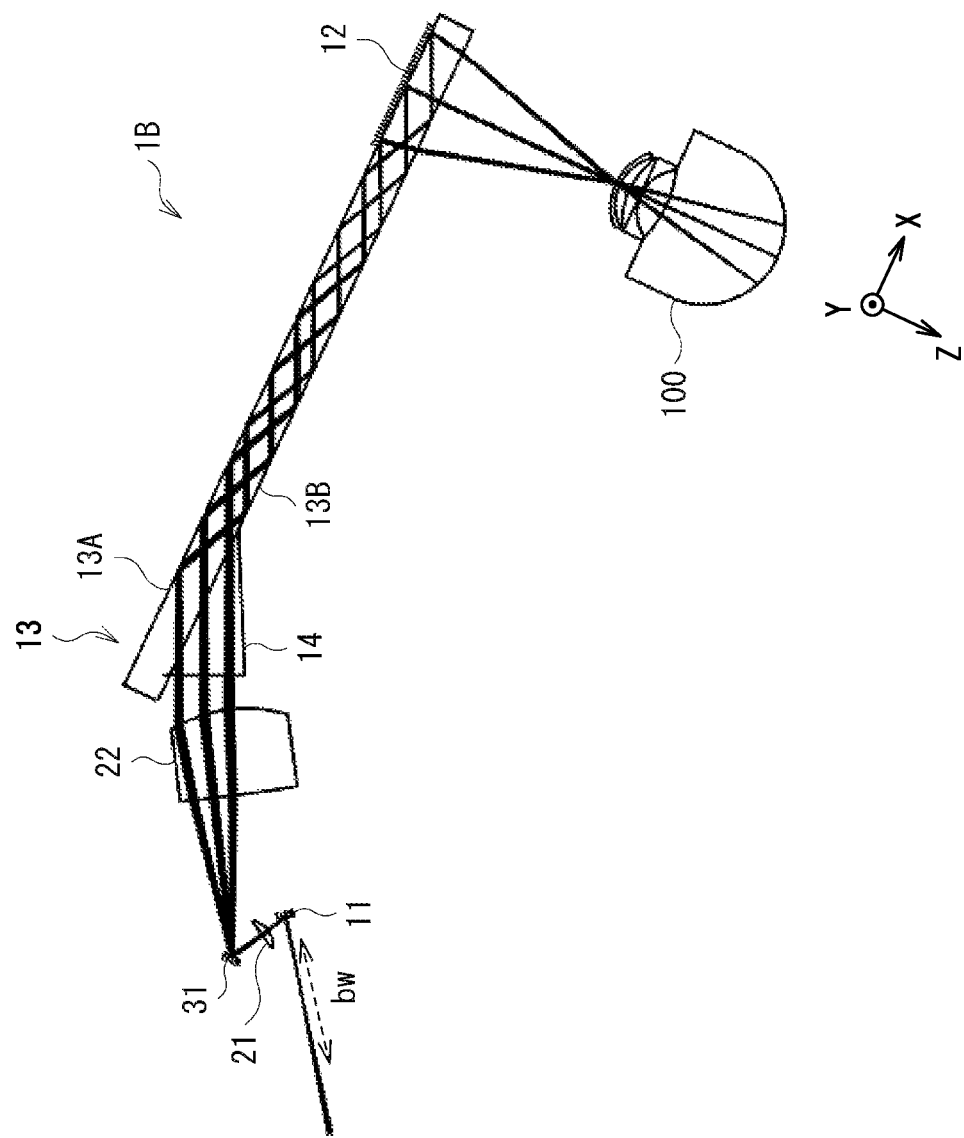
[ FIG. 16 ]

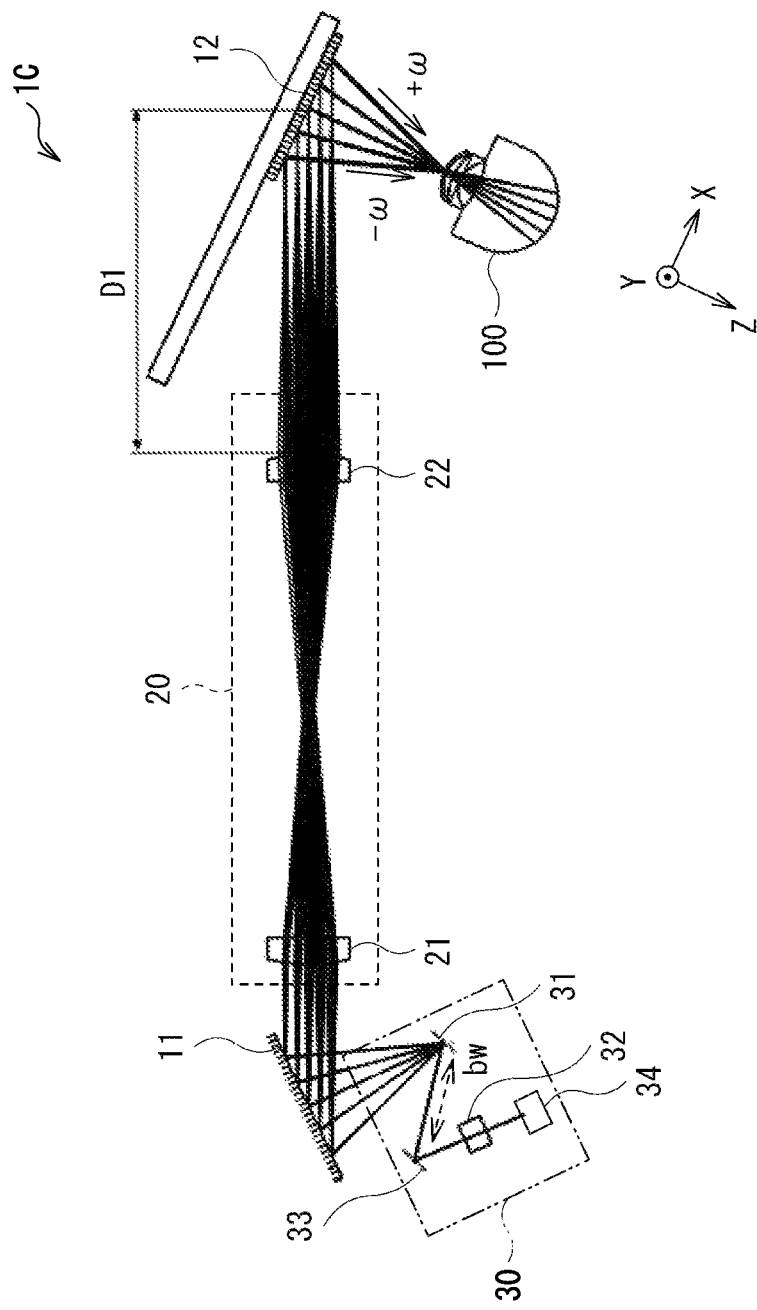
[ FIG. 17 ]

[ FIG. 18 ]
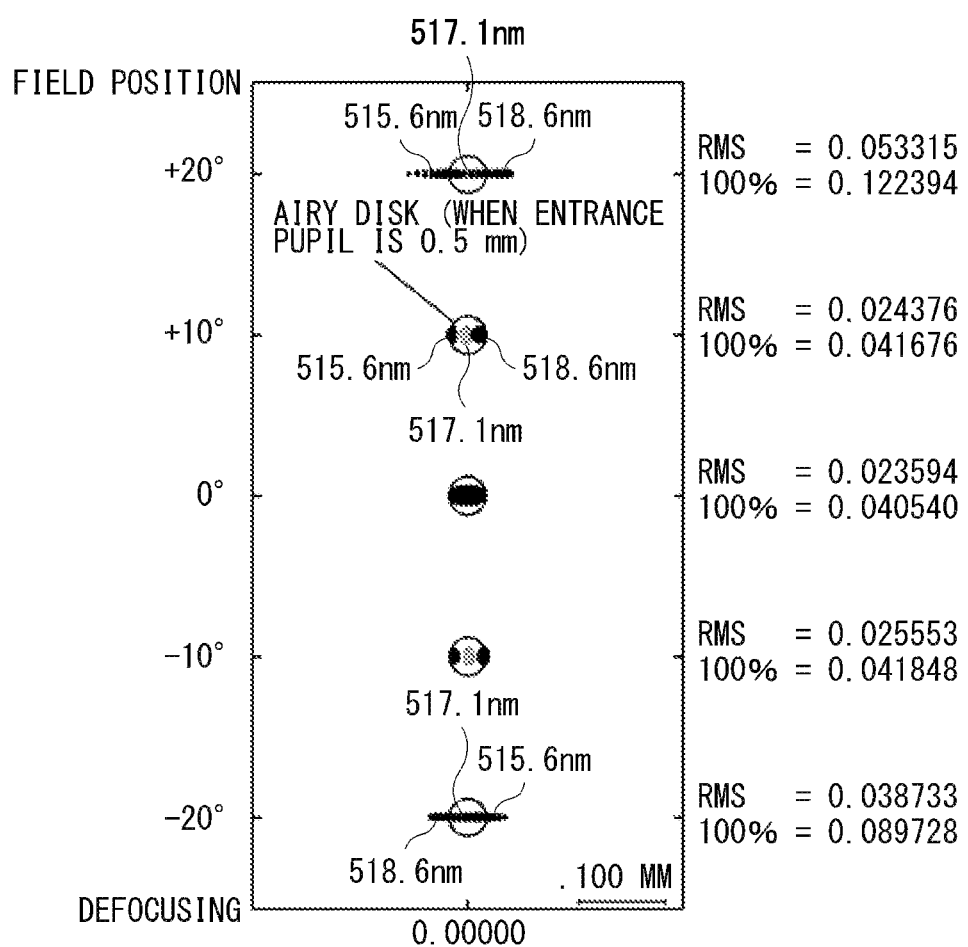

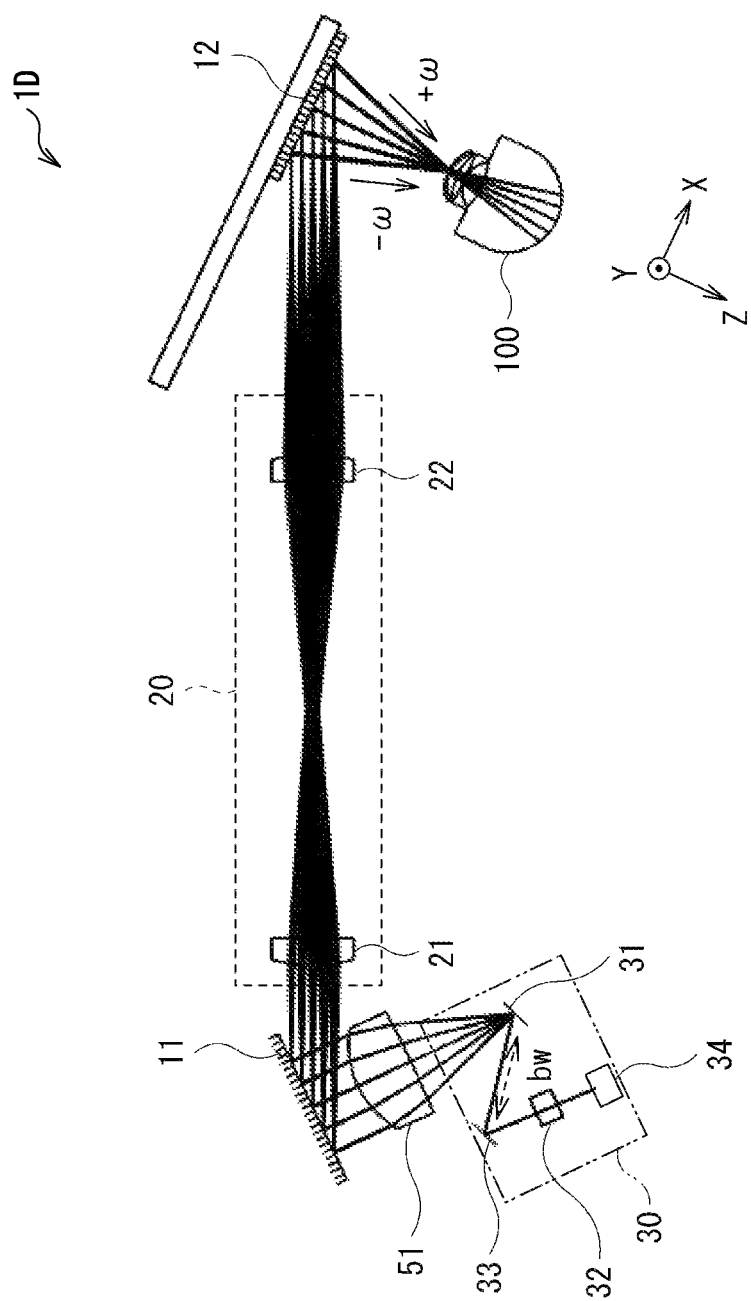
[ FIG. 19 ]

[ FIG. 20 ]
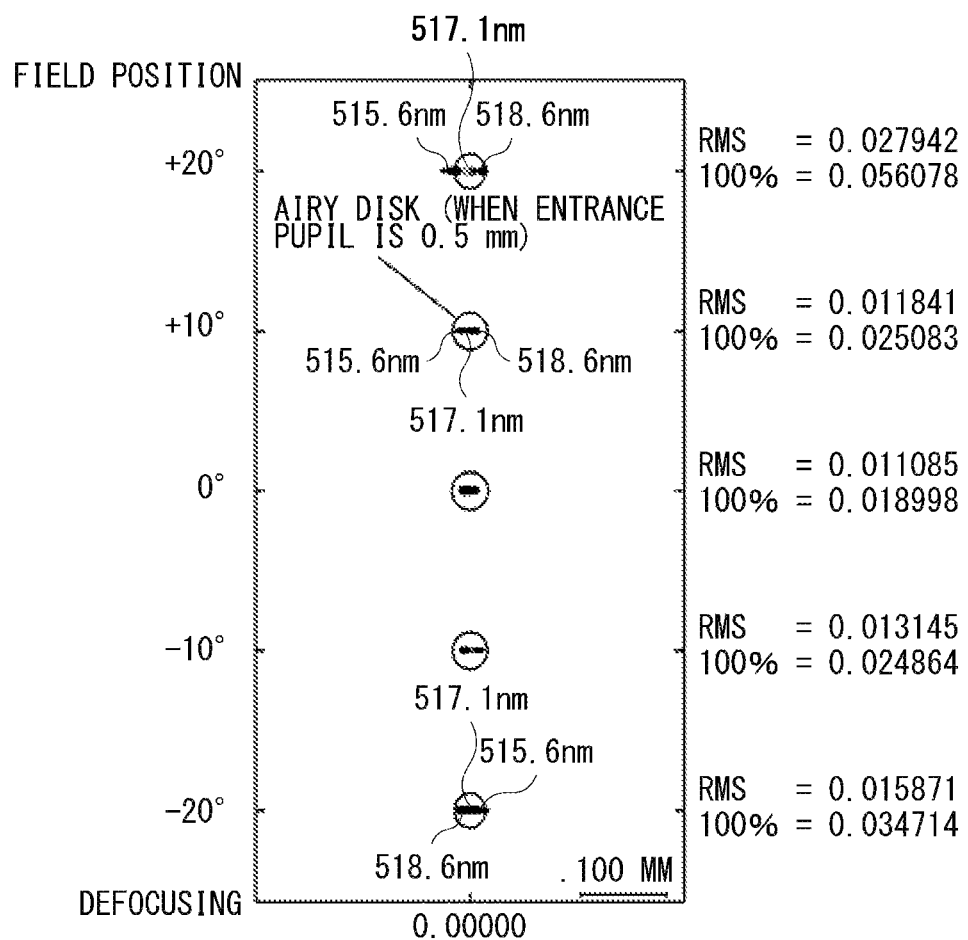

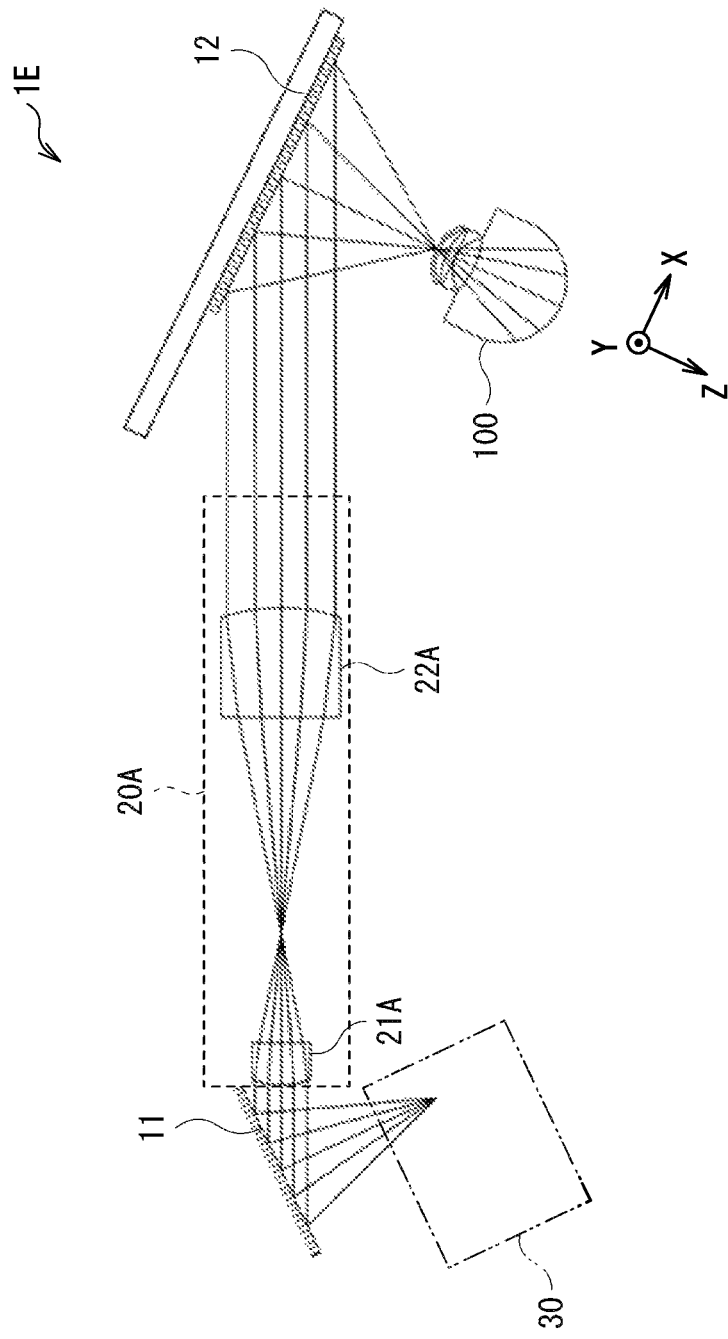
[ FIG. 21 ]

[ FIG. 22 ]
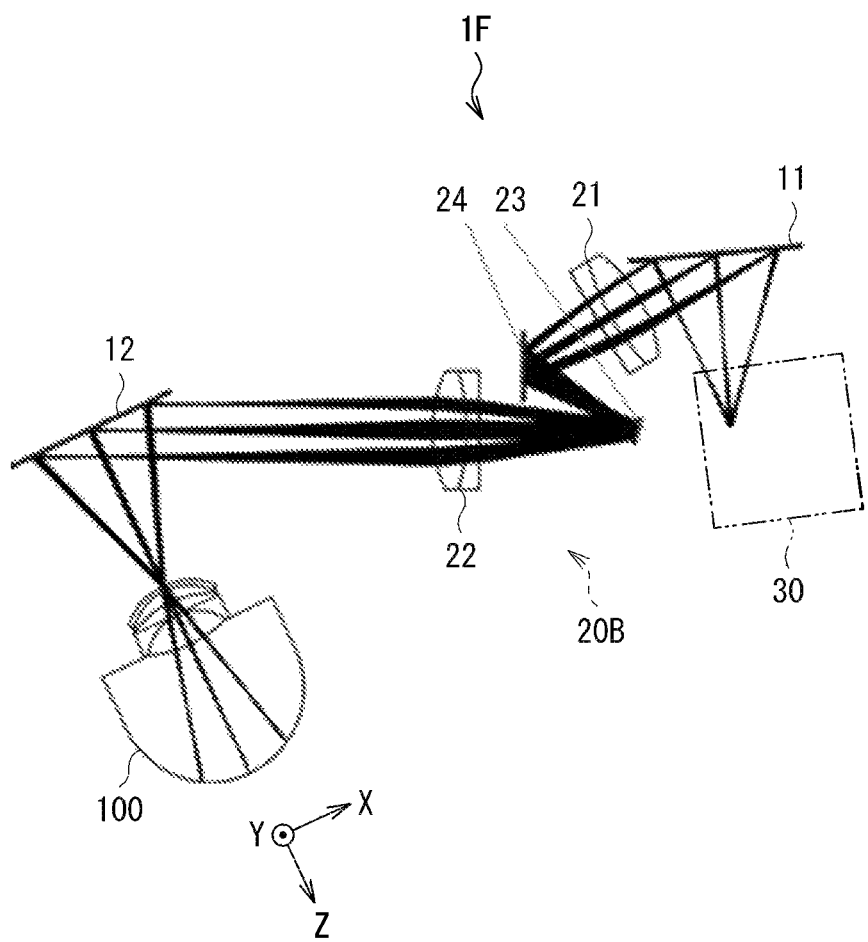

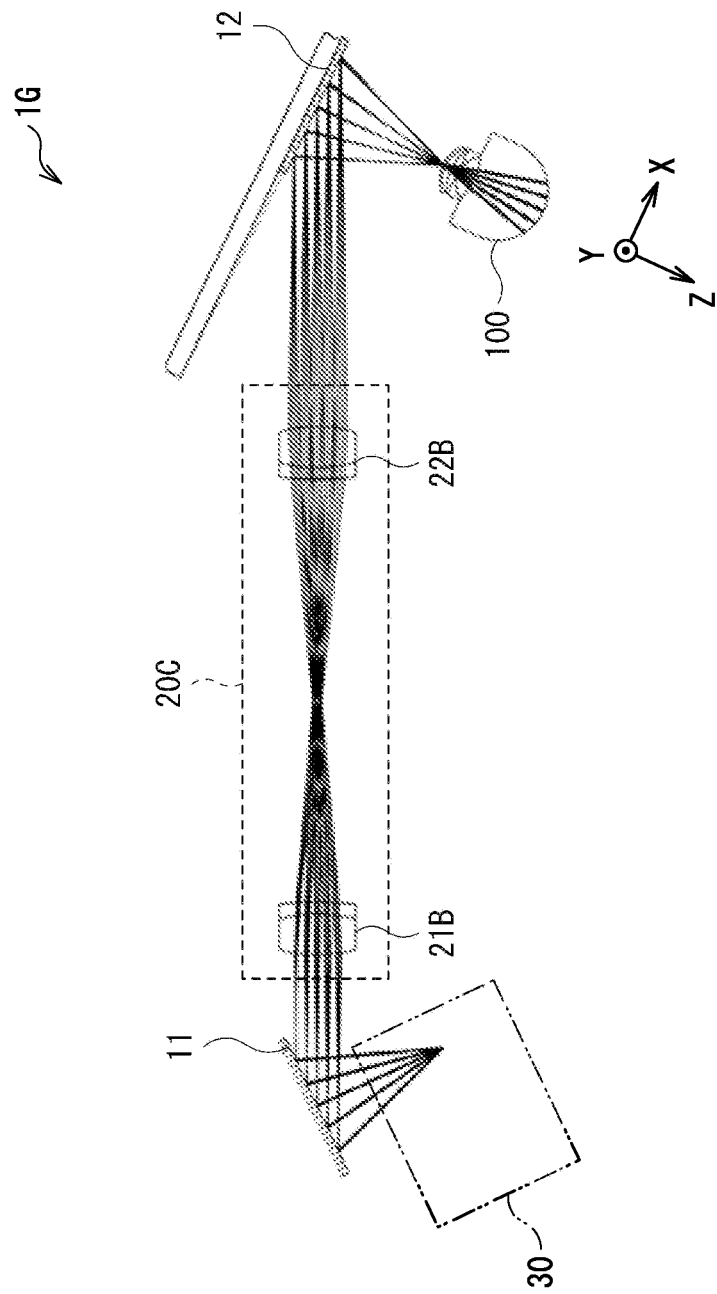
[ FIG. 23 ]

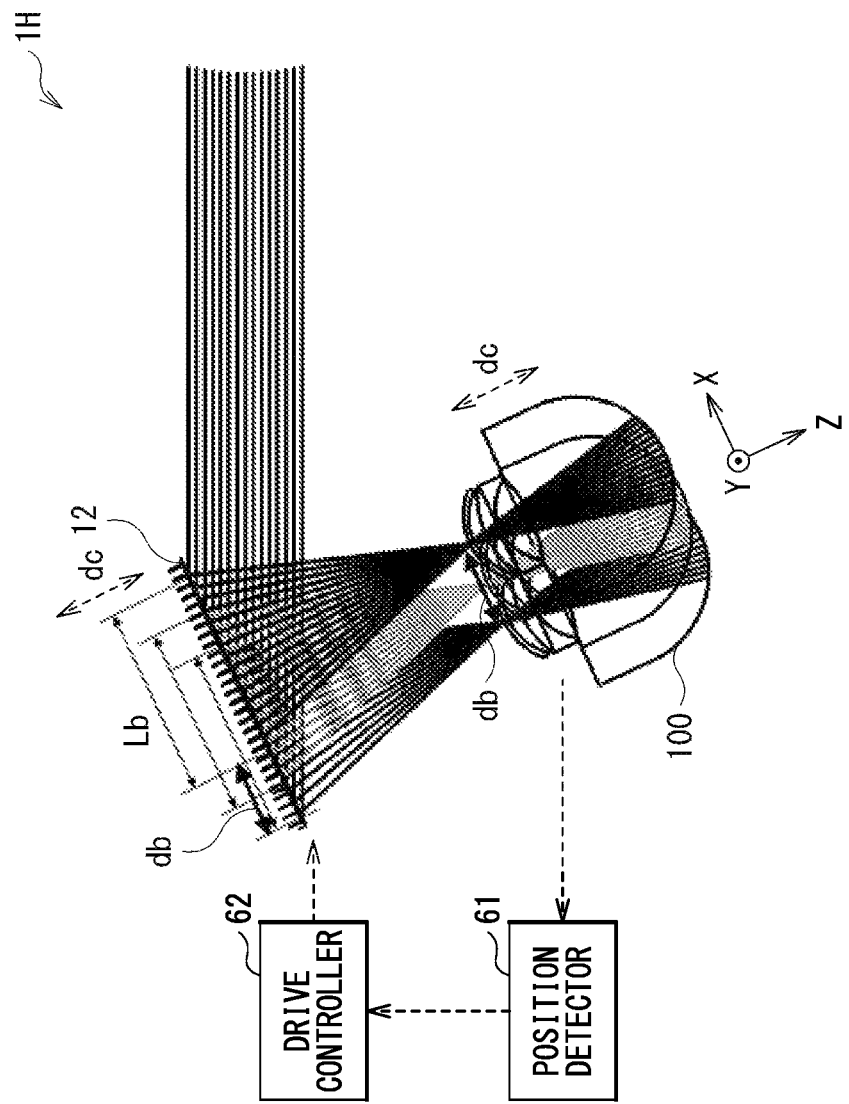
[ FIG. 24 ]

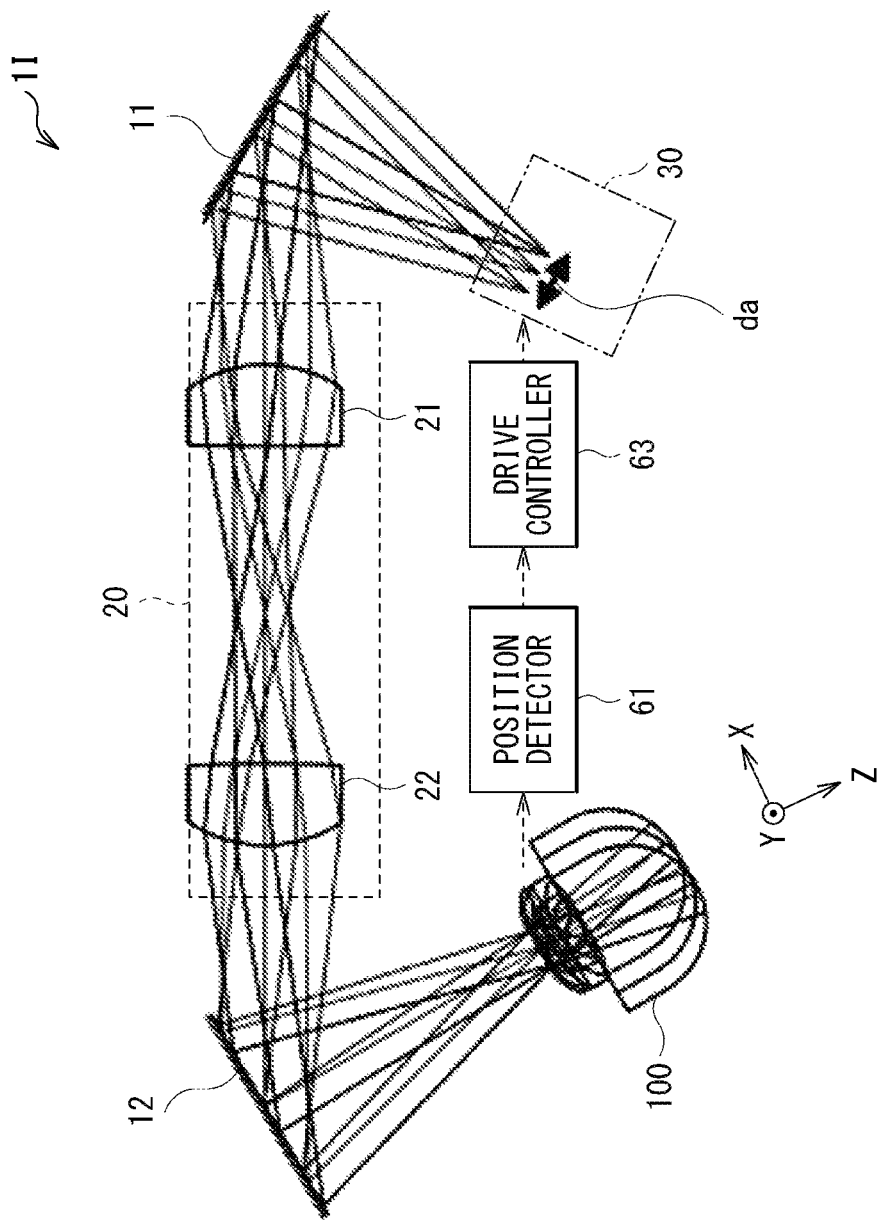
[ FIG. 25 ]

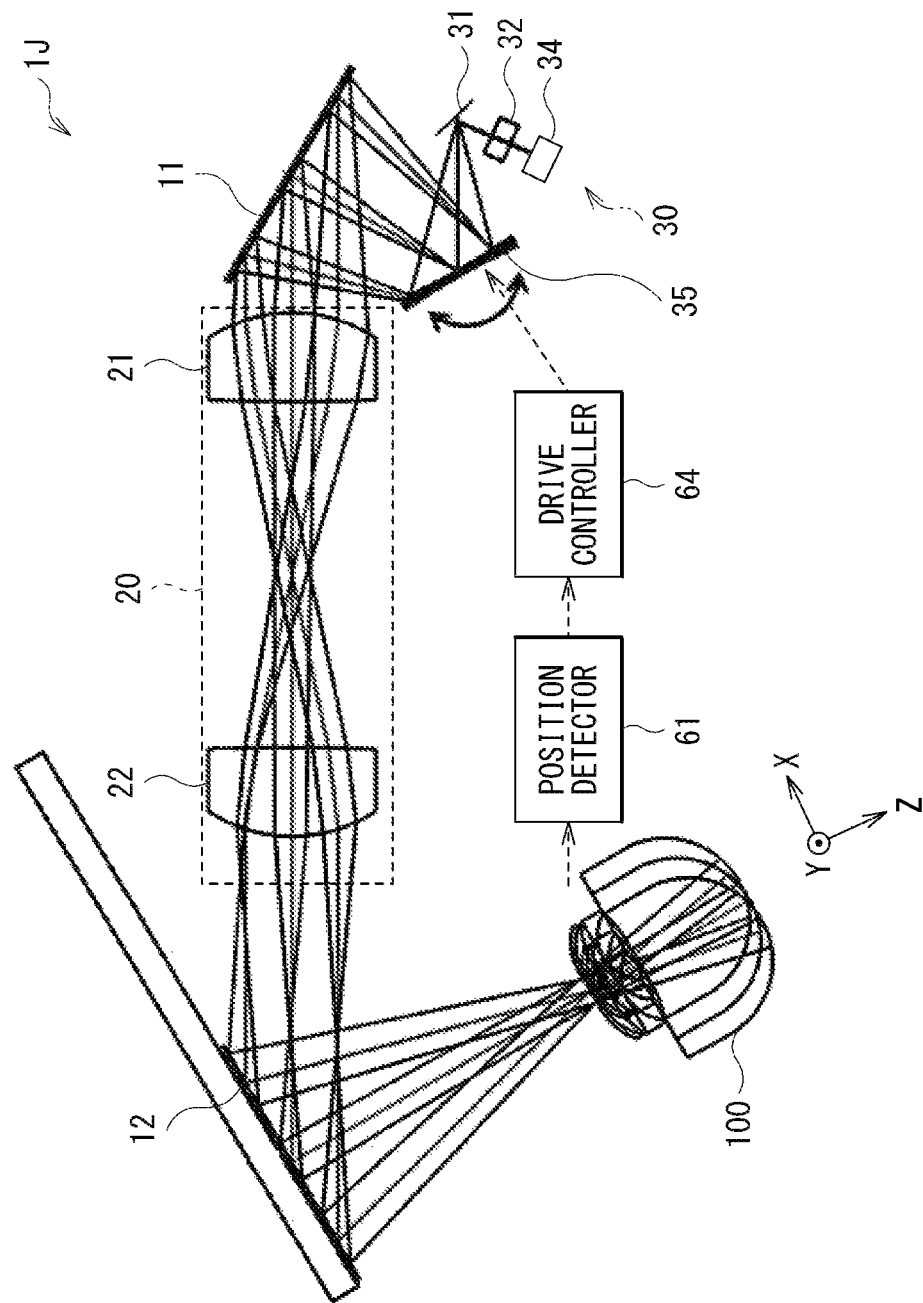
[ FIG. 26 ]

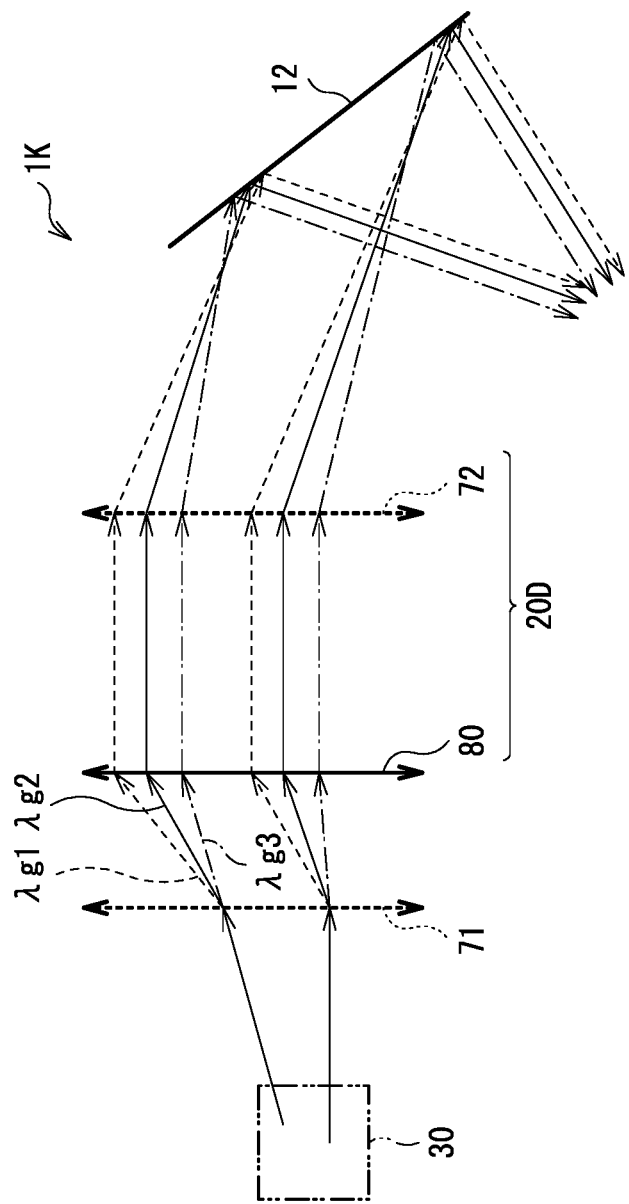
[ FIG. 27 ]

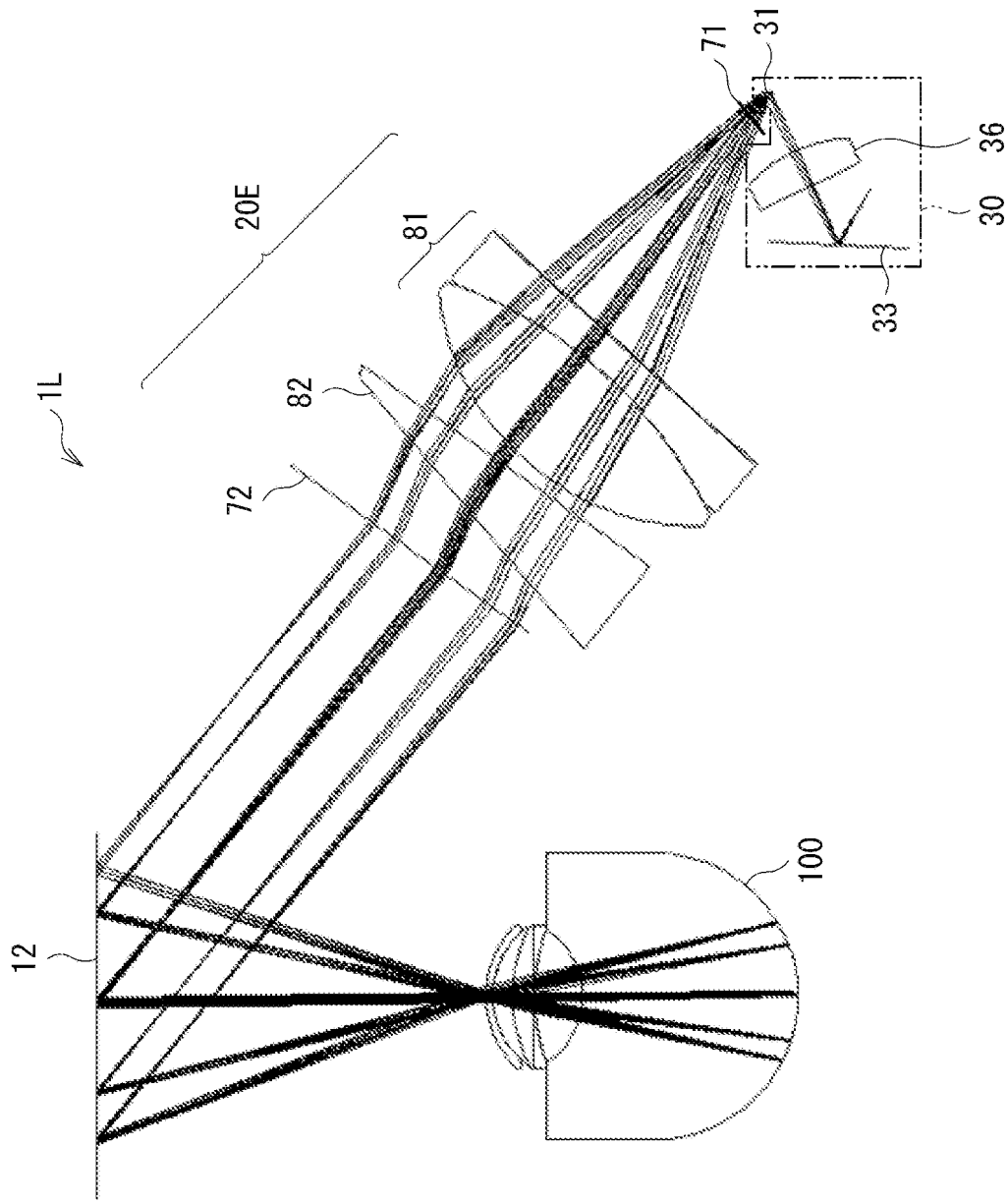
[ FIG. 28 ]

[ FIG. 29 ]
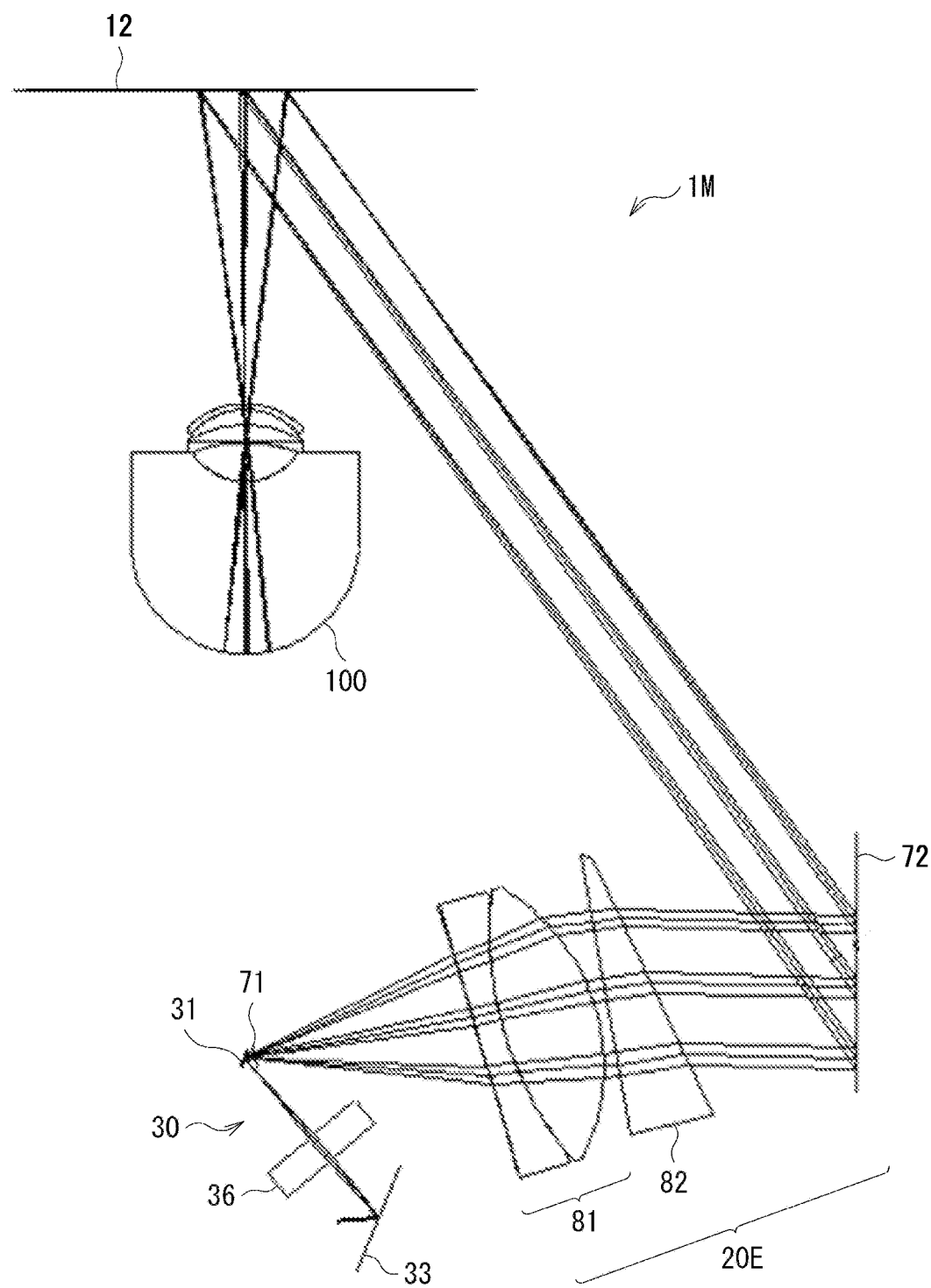

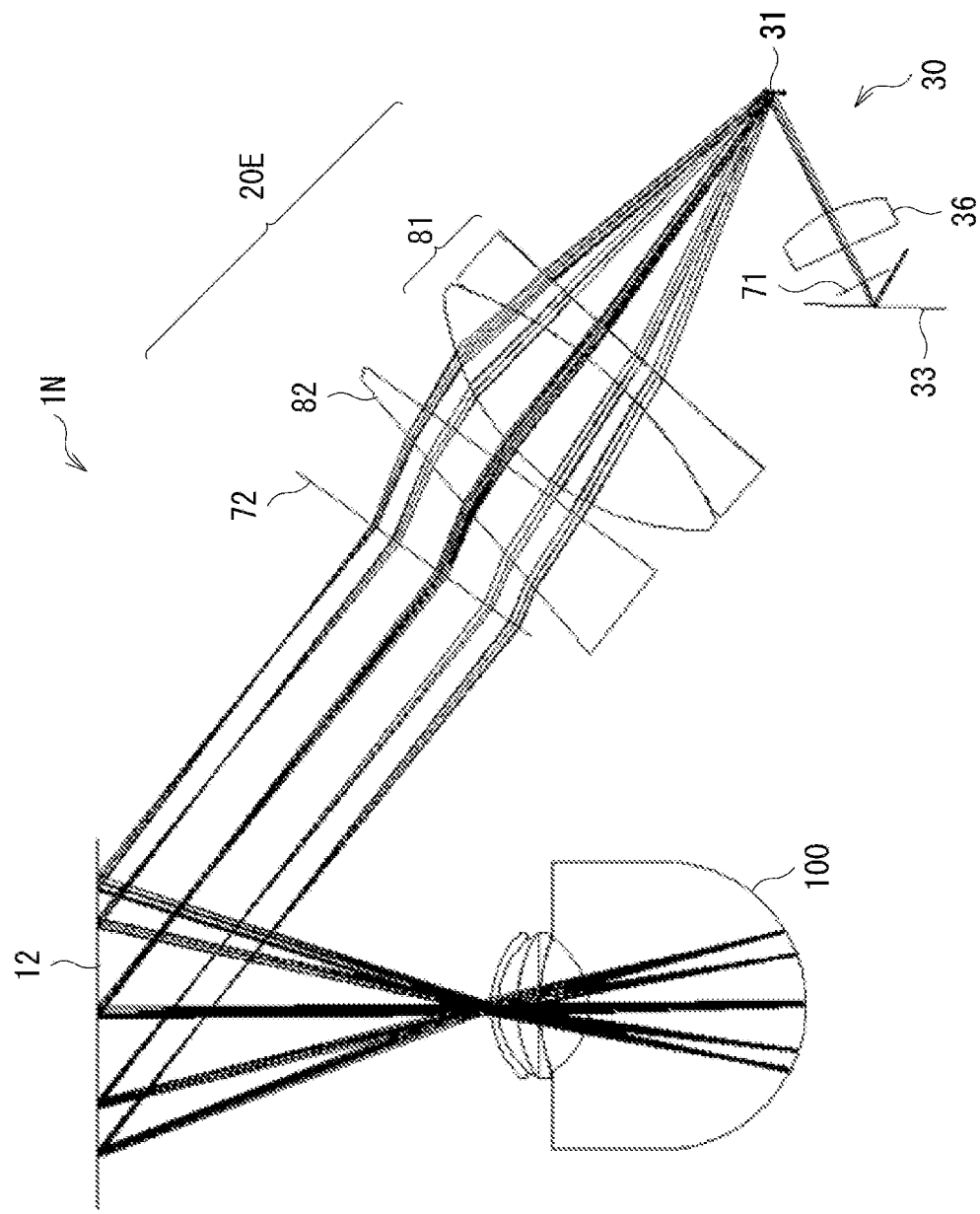
[ FIG. 30 ]

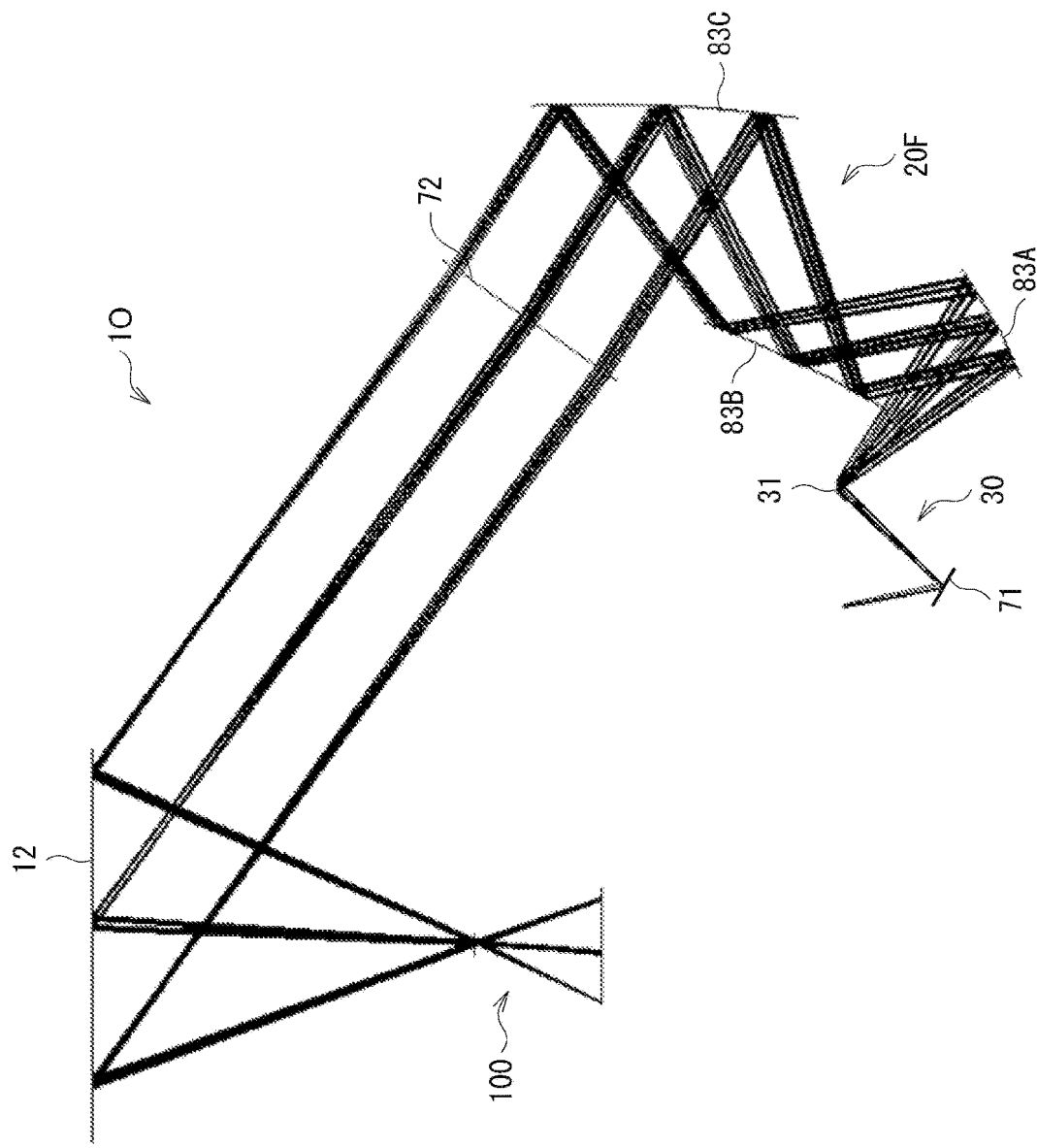
[ FIG. 31 ]

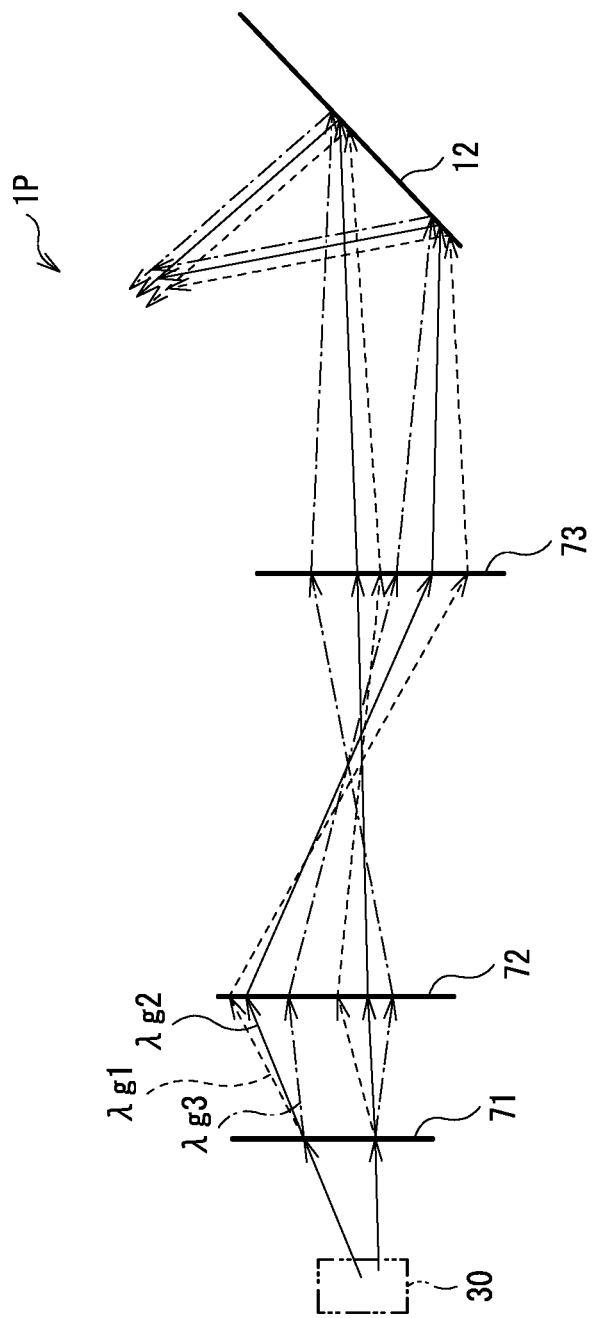
[ FIG. 32 ]

IMAGE DISPLAY APPARATUS

TECHNICAL FIELD

The present disclosure relates to an image display apparatus that guides image light to a pupil of a viewer.

BACKGROUND ART

An image display apparatus has been developed that guides image light to a pupil of a viewer. Such an image display apparatus has been utilized, for example, as a head-mounted display (see PTLs 1 and 2). For example, an image display apparatus has been developed that generates image light by scanning light from a light source with a scan unit and guides the generated image light to a pupil of a viewer.

CITATION LIST

Patent Literature

PTL 1: Japanese Unexamined Patent Application Publication No. 2008-83539
PTL 2: Japanese Unexamined Patent Application Publication No. H11-194295 (FIG. 4)

SUMMARY OF THE INVENTION

In the image display apparatus described above, various aberrations including chromatic aberrations, for example, can occur depending on a configuration of an optical system that guides image light to the pupil of the viewer, resulting in degradation of image quality.

It is desirable to provide an image display apparatus that makes it possible to display a high quality image with less chromatic aberration.

An image display apparatus according to an embodiment of the present disclosure includes: an image light formation section that outputs image light; a diffractive optical system that includes a first diffractive section including at least one diffractive device and a second diffractive section causing the image light to converge at a pupil position of a viewer, the first diffractive section having a property of correcting a chromatic aberration that occurs at the second diffractive section; and a relay optical system disposed closer to the image light formation section than the second diffractive section and relaying the image light to the second diffractive section to correct the chromatic aberration that occurs at the second diffractive section.

In the image display apparatus according to the embodiment of the present disclosure, the first diffractive section and the relay optical system correct the chromatic aberration that occurs at the second diffractive section.

BRIEF DESCRIPTION OF DRAWINGS

FIG. 9 is an explanatory diagram illustrating an outline of a method of correcting the field curvature that occurs in the image display apparatus according to the first embodiment.
FIG. 10 is a configuration diagram illustrating a first specific example of the image display apparatus according to the first embodiment.
FIG. 11 is a spot diagram illustrating an image-forming capability of the image display apparatus according to the first specific example.
FIG. 12 is a spot diagram illustrating the image-forming capability of the image display apparatus according to the first specific example.
FIG. 13 is a spot diagram illustrating the image-forming capability of the image display apparatus according to the first specific example.
FIG. 14 is a spot diagram illustrating the image-forming capability of the image display apparatus according to the first specific example.
FIG. 15 is a spot diagram illustrating the image-forming capability of the image display apparatus according to the first specific example.
FIG. 16 is a configuration diagram illustrating a second specific example of the image display apparatus according to the first embodiment.
FIG. 17 is a configuration diagram illustrating a third specific example of the image display apparatus according to the first embodiment.
FIG. 18 is a spot diagram illustrating an image-forming capability of the image display apparatus according to the third specific example.
FIG. 19 is a configuration diagram illustrating a fourth specific example of the image display apparatus according to the first embodiment.
FIG. 20 is a spot diagram illustrating an image-forming capability of the image display apparatus according to the fourth specific example.
FIG. 21 is a configuration diagram illustrating a fifth specific example of the image display apparatus according to the first embodiment.
FIG. 22 is a configuration diagram illustrating a sixth specific example of the image display apparatus according to the first embodiment.
FIG. 23 is a configuration diagram illustrating a seventh specific example of the image display apparatus according to the first embodiment.
FIG. 24 is a configuration diagram illustrating a first specific example of an image display apparatus according to a second embodiment.
FIG. 25 is a configuration diagram illustrating a second specific example of the image display apparatus according to the second embodiment.

FIG. 26 is a configuration diagram illustrating a third specific example of the image display apparatus according to the second embodiment.

FIG. 27 is a configuration diagram illustrating an outline of an image display apparatus according to a third embodiment.

FIG. 28 is a configuration diagram illustrating a first specific example of the image display apparatus according to the third embodiment.

FIG. 29 is a configuration diagram illustrating a second specific example of the image display apparatus according to the third embodiment.

FIG. 30 is a configuration diagram illustrating a third specific example of the image display apparatus according to the third embodiment.

FIG. 31 is a configuration diagram illustrating a fourth specific example of the image display apparatus according to the third embodiment.

FIG. 32 is a configuration diagram illustrating a modification example of the image display apparatus according to the third embodiment.

MODES FOR CARRYING OUT THE INVENTION

Some embodiments of the present disclosure are described in detail below with reference to the drawings. It is to be noted that descriptions are given in the following order.
1. First Embodiment (an image display apparatus in which an aberration is corrected)
 1.0. Comparative Example (FIGS. 1 to 2)
 1.1. Outline of Image Display Apparatus According to First Embodiment (FIGS. 3 to 9)
 1.2. Specific Examples of Image Display Apparatus According to First Embodiment (FIGS. 10 to 23)
 1.3. Effects
2. Second Embodiment (an image display apparatus that performs display in accordance with a pupil position of a viewer) (FIGS. 24 to 26)
3. Third Embodiment (an image display apparatus in which a first diffractive section includes a plurality of diffractive devices)
 3.1. Outline of Image Display Apparatus According to Third Embodiment (FIG. 27)
 3.2. Specific Examples of Image Display Apparatus According to Third Embodiment (FIGS. 28 to 31)
 3.3. Modification Example of Image Display Apparatus According to Third Embodiment (FIG. 32)
 3.4. Effects

4. OTHER EMBODIMENTS

1. FIRST EMBODIMENT

1.0. Comparative Example

Outline and Issues of Image Display Apparatus According to Comparative Example

Figure 1:
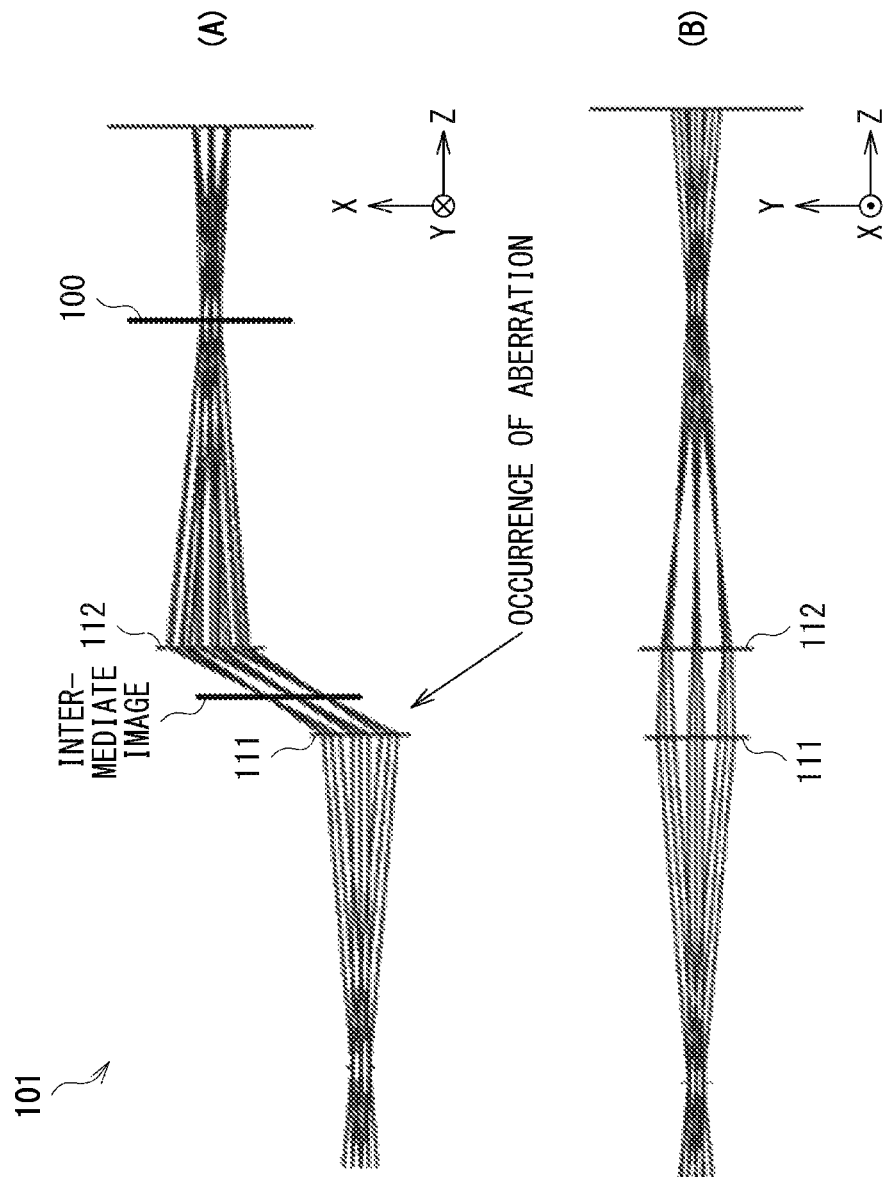
FIG. 1 is a configuration diagram illustrating an outline of an image display apparatus according to a comparative example.

FIG. 1 illustrates an outline of an image display apparatus 101 according to a comparative example.

In FIG. 1, a depth direction of an eye 100 of a viewer is a Z direction. Two directions orthogonal to the Z direction are an X direction and a Y direction. Further, the X direction and the Y direction are orthogonal to each other. For example, the X direction corresponds to a horizontal direction of a field of view of the viewer, and the Y direction corresponds to a vertical direction of the field of view. A direction of an optical path (an optical axis) of the image display apparatus 1O1 corresponds to the Z direction. The same applies to image display apparatuses according to embodiments described later.

FIG. 1 illustrates in a simplified manner a configuration of the image display apparatus 1O1 based on the technique described in PTL 1 (Japanese Unexamined Patent Application Publication No. 2008-83539). An upper half (A) of FIG. 1 illustrates a configuration in an XZ plane, and a lower half (B) of FIG. 1 illustrates a configuration in a YZ plane.

PTL 1 describes the configuration in which a first diffractive section 111 and a second diffractive section 112 are disposed on a light guide plate to allow image light to enter the light guide plate via the first diffractive section 111. The image light that has entered the light guide plate forms an intermediate image inside the light guide plate, and is then guided by the light guide plate to the second diffractive section 112. The image light is eventually outputted from the second diffractive section 112 toward the eye 100 of the viewer.

In the image display apparatus 1O1 according to the comparative example, the second diffractive section 112 is disposed at a position symmetrical about the intermediate image formed behind the first diffractive section 111 to correct a field curvature and a spherical aberration that occur for a single wavelength band at the first diffractive section 111.

Figure 2:
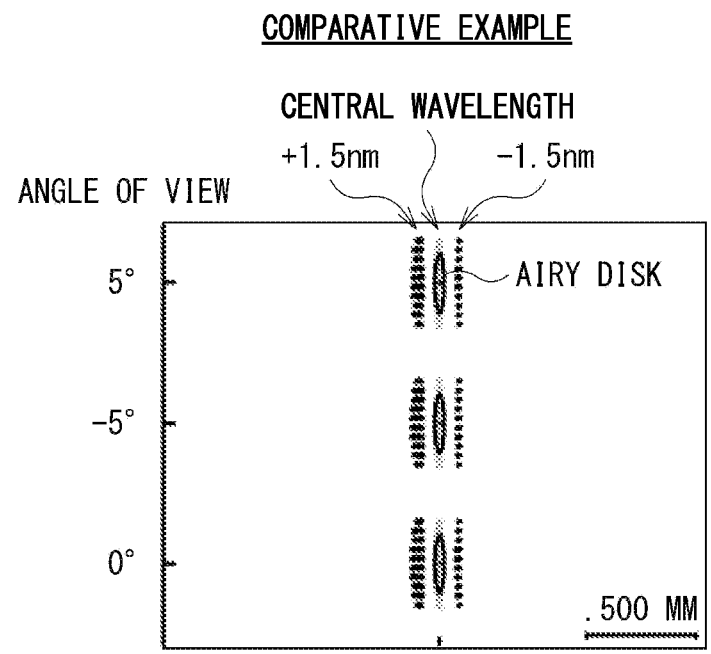
FIG. 2 is a spot diagram illustrating an image-forming capability of the image display apparatus according to the comparative example.

FIG. 2 is a spot diagram illustrating an image-forming capability of the image display apparatus 1O1 according to the comparative example. Assuming the eye 100 of the viewer as an ideal lens, FIG. 2 illustrates a spot diagram on an image plane resulting from passage through the ideal lens. Note that the same applies to spot diagrams illustrated in other drawings described later.

FIG. 2 illustrates the spot diagram of light of a central wavelength in the single wavelength band and light of wavelengths equal to the central wavelength ±1.5 nm. In the image display apparatus 1O1 according to the comparative example, a chromatic aberration occurs at the first diffractive section 111 for a single wavelength band of light emitted from a single light source. The image display apparatus 1O1 according to the comparative example faces difficulties in correcting this chromatic aberration. This results in separation of an image on the image plane as illustrated in FIG. 2, thus degrading image quality.

Meanwhile, PTL 2 (Japanese Unexamined Patent Application Publication No. H11-194295 (FIG. 4)) discloses a technique of using chromatic aberration generation means such as a diffractive optical element to correct a chromatic aberration that occurs due to arrangement of a plurality of light sources of different colors. It is difficult, however, with the technique described in PTL 2, to correct chromatic aberrations occurring across different wavelengths of light of the same color (in a single wavelength band) emitted from a single light source.

To cope with this, the present disclosure provides a technique that makes it possible to suppress chromatic aberrations occurring for a single wavelength band. In addition, the present disclosure provides a technique that makes it possible to suppress astigmatism and a field curvature. The present disclosure thereby provides an image display apparatus that is able to display a high quality image.

1.1 Outline of Image Display Apparatus According to First Embodiment (Outline of Image Display Apparatus)

Figure 3:
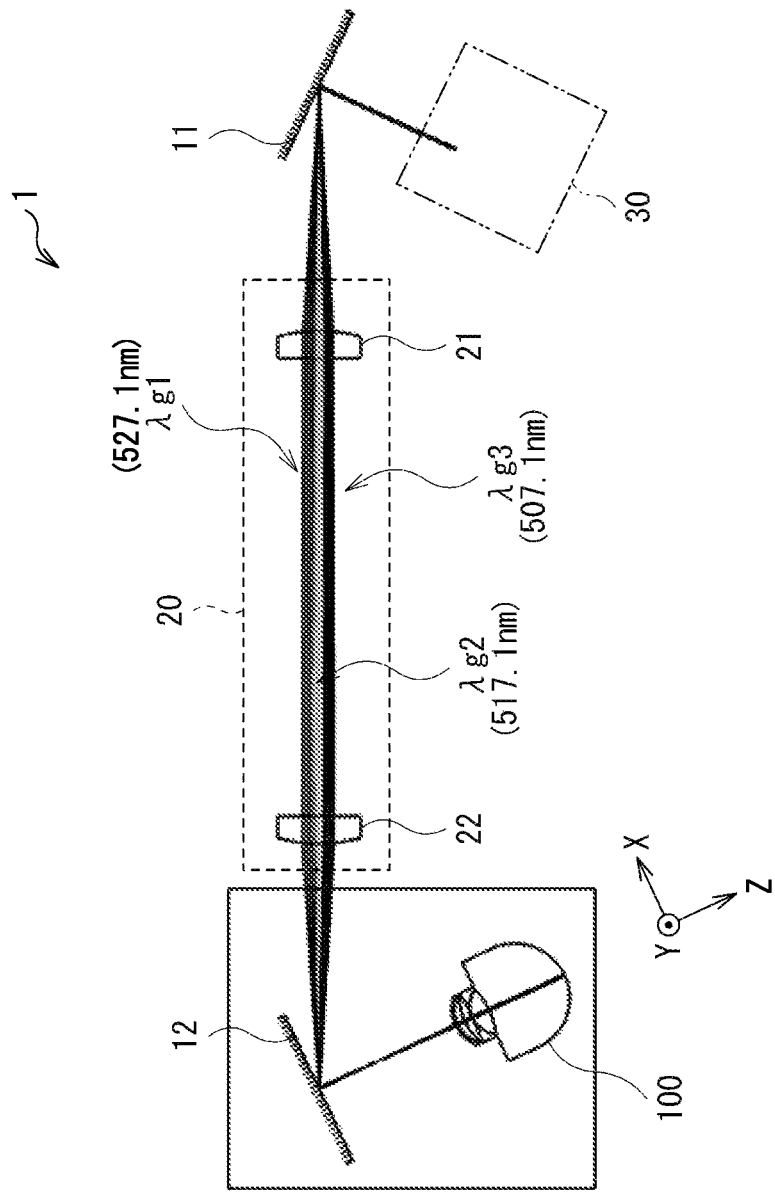
FIG. 3 is a configuration diagram illustrating an outline of an image display apparatus according to a first embodiment of the present disclosure.

FIG. 3 illustrates an outline of an image display apparatus 1 according to a first embodiment of the present disclosure. FIG. 3 illustrates a configuration in the XZ plane.

The image display apparatus 1 according to the first embodiment includes an image light formation section 30 that generates and outputs image light. The image display apparatus 1 further includes a first diffractive section 11, a second diffractive section 12, a relay optical system 20, and the image light formation section 30.

The image display apparatus 1 is an apparatus that guides image light generated by the image light formation section 30 to a pupil position of the eye 100 of a viewer, and is usable, for example, as a head-mounted display.

The image light formation section 30 includes a light source serving as a source of the image light, and a scanning optical device that forms the image light by scanning a flux of light emitted from the light source.

Note that as optical paths of the image light, FIG. 3 illustrates optical paths of light of three wavelengths in a single wavelength band (first wavelength light $\lambda g1$, second wavelength light $\lambda g2$, and third wavelength light $\lambda g3$). It is to be noted that although light of a single wavelength band is typically assumed to have a range of about ±1.5 nm, FIG. 3 provides illustration with the wavelength widths enlarged for ease of recognition of aberrations. FIG. 3 illustrates the second wavelength light $\lambda g2$ as light of a central wavelength, and the first wavelength light $\lambda g1$ and the third wavelength light $\lambda g3$ as light of wavelengths equal to the central wavelength ±10 nm. The second wavelength light $\lambda g2$ is light of 517.1 nm, for example. The first wavelength light $\lambda g1$ is light of 527.1 nm, for example. The third wavelength light $\lambda g3$ is light of 507.1 nm, for example.

The first diffractive section 11 has a property of correcting a chromatic aberration that occurs at the second diffractive section 12. The first diffractive section 11 may be a holographic optical element (HOE), for example. The first diffractive section 11 may otherwise be a diffraction grating (DOE), for example.

The second diffractive section 12 has a role of causing the image light to converge at the pupil position of the viewer. The second diffractive section 12 may be a holographic optical element, for example. The second diffractive section 12 may otherwise be a diffraction grating, for example.

The relay optical system 20 is disposed closer to the image light formation section 30 than the second diffractive section 12. The relay optical system 20 has a role of relaying the image light from the first diffractive section 11 to the second diffractive section 12 to correct a chromatic aberration that occurs at the second diffractive section 12. The relay optical system 20 includes a first relay lens 21 and a second relay lens 22.

(Outline of Aberration Occurring in Image Display Apparatus 1)

Figure 4:
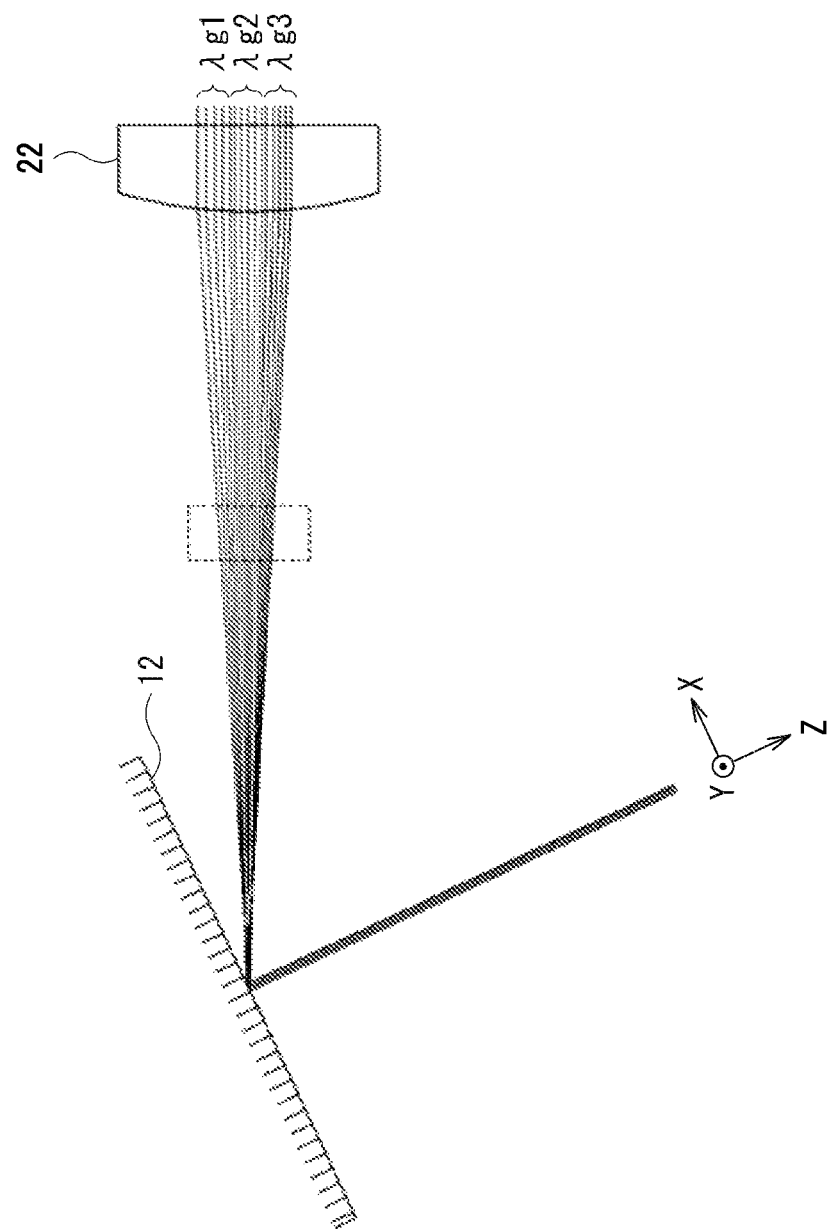
FIG. 4 is an explanatory diagram illustrating an outline of a chromatic aberration that occurs in the image display apparatus according to the first embodiment.
Figure 5:
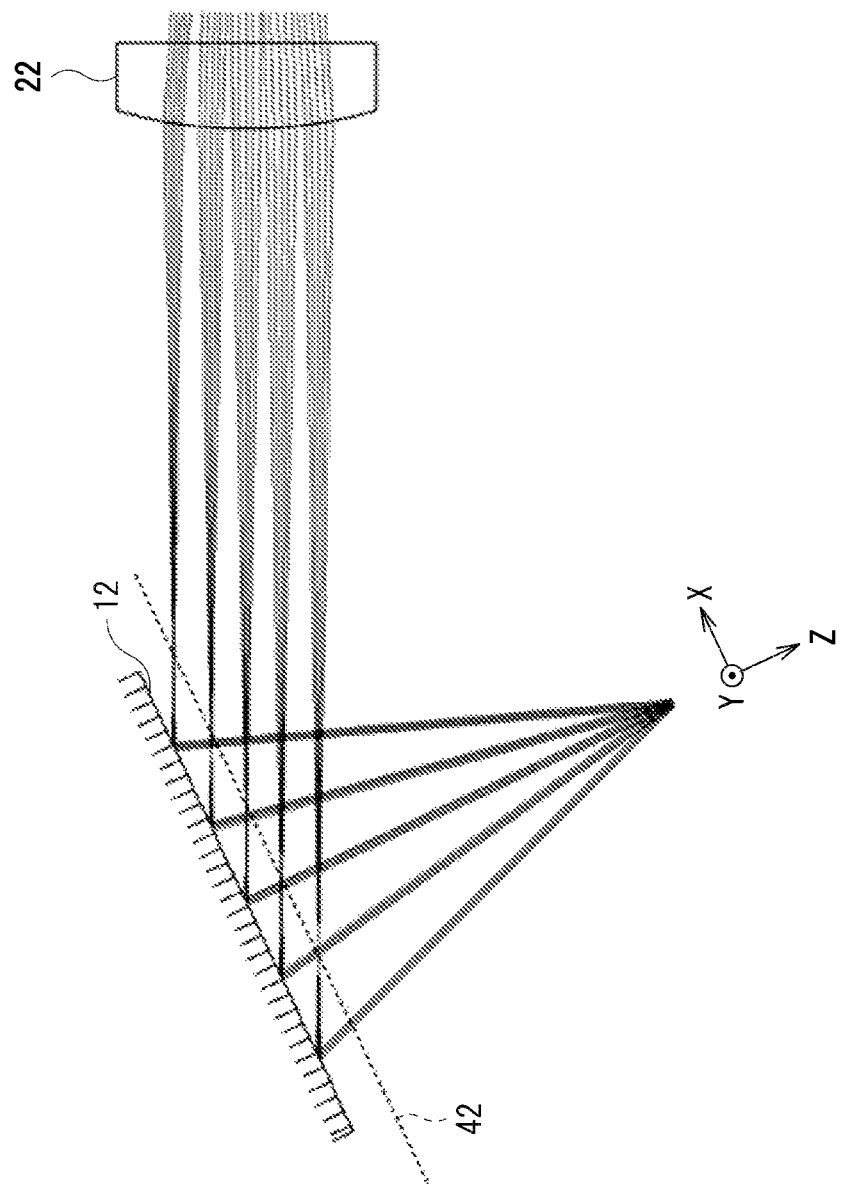
FIG. 5 is an explanatory diagram illustrating an outline of a field curvature that occurs in the image display apparatus according to the first embodiment.
Figure 6:
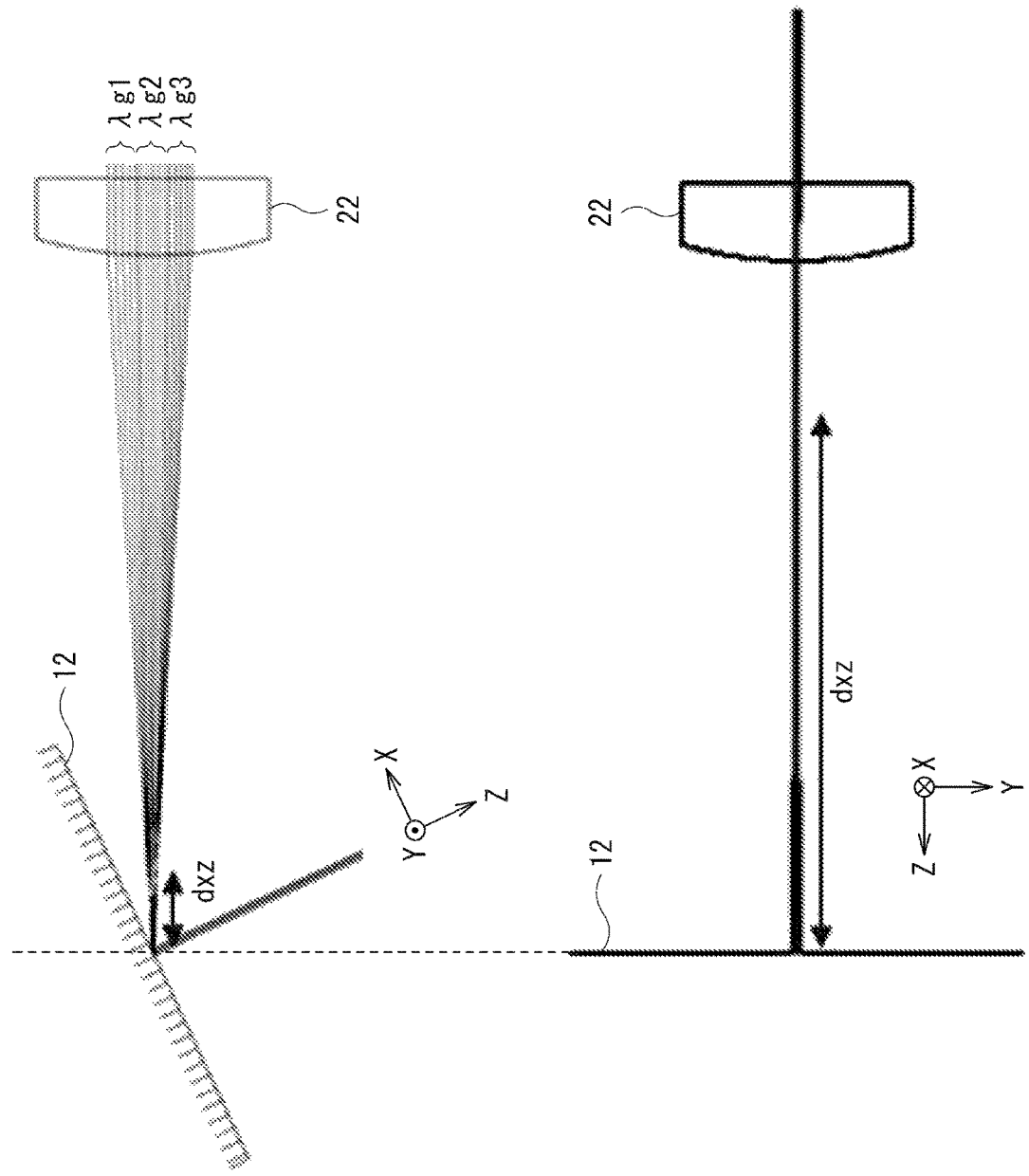
FIG. 6 is an explanatory diagram illustrating an outline of astigmatism that occurs in the image display apparatus according to the first embodiment.
Figure 7:
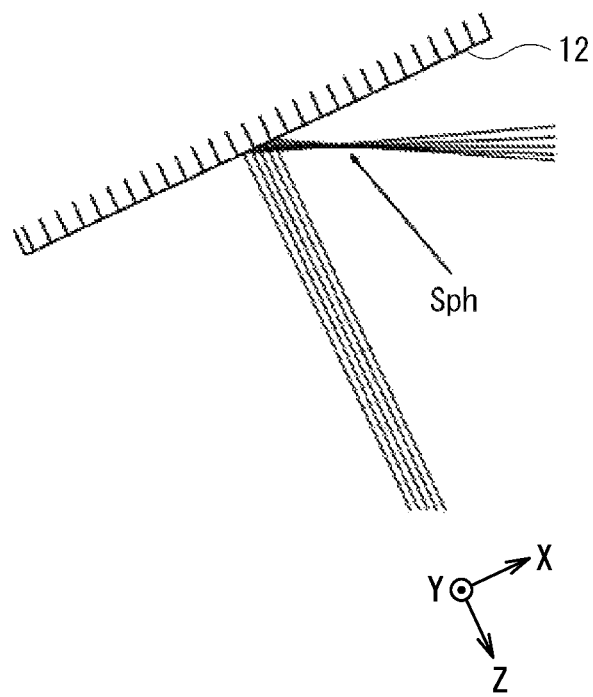
FIG. 7 is an explanatory diagram illustrating an outline of a spherical aberration that occurs in the image display apparatus according to the first embodiment.

FIG. 4 illustrates an outline of a chromatic aberration that occurs in the image display apparatus 1. FIG. 5 illustrates an outline of a field curvature that occurs in the image display apparatus 1. FIG. 6 illustrates an outline of astigmatism that occurs in the image display apparatus 1. An upper half of FIG. 6 illustrates a configuration in the XZ plane. A lower half of FIG. 6 illustrates a configuration in the YZ plane. FIG. 7 illustrates an outline of a spherical aberration that occurs in the image display apparatus 1.

The chromatic aberration occurs due to the image light being deflected in directions that vary from one wavelength to another at the second diffractive section 12 (see FIG. 4). It is desirable that the light of respective wavelengths enter the eye 100 of the viewer while being in an aligned state.

The field curvature occurs due to the image plane (an image formation point) 42 (see FIG. 5) being tilted with respect to a main light beam.

The image display apparatus 1 has a configuration of an eccentric optical system. A diffractive device in the eccentric optical system has power that differs between light that enters an eccentric surface and light that enters a surface other than the eccentric surface. A difference therefore occurs between an image formation position in the XZ plane and an image formation position in the YZ plane, resulting in astigmatism. For example, as illustrated in FIG. 6, a difference between a distance dxz from the second diffractive section 12 to an image formation point in the XZ plane and a distance dyz from the second diffractive section 12 to an image formation point in the YZ plane results in astigmatism.

In the image display apparatus 1, the spherical aberration Sph occurs due to pieces of light that have entered at different heights failing to form an image at a single point in the XZ plane.

(Outline of Correction Method for Aberration Occurring in Image Display Apparatus 1)

Figure 8:
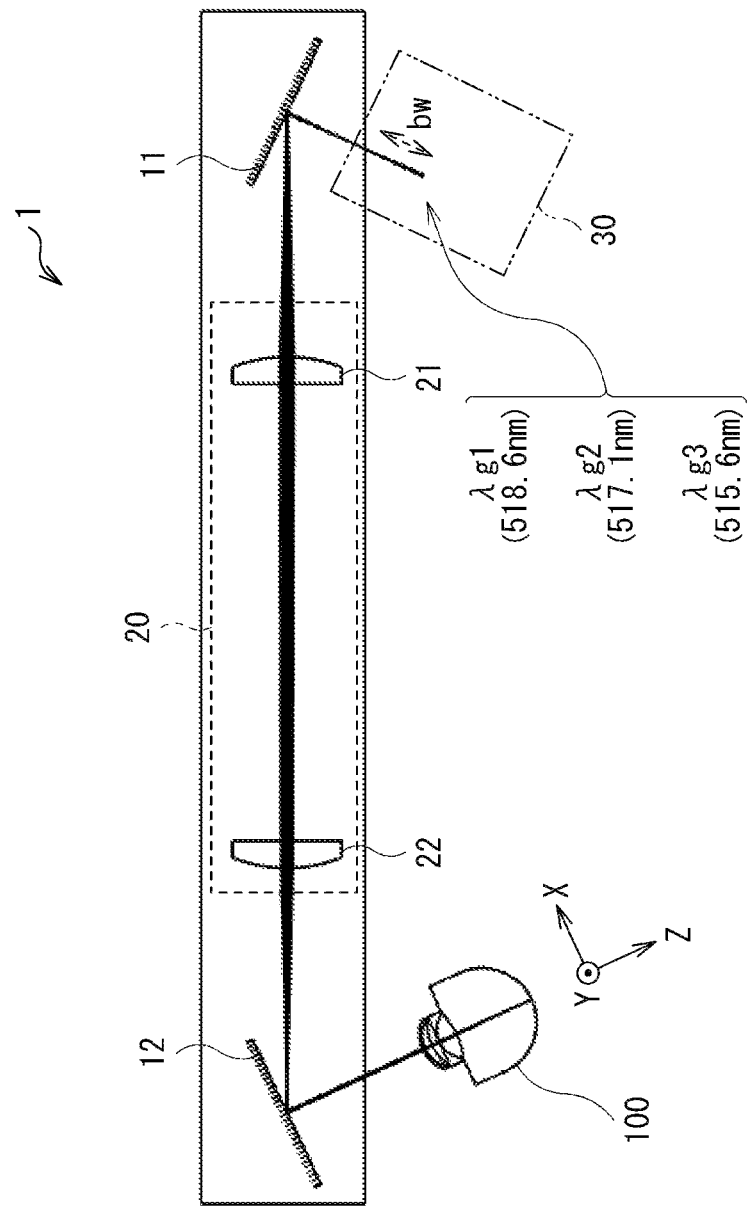
FIG. 8 is an explanatory diagram illustrating an outline of a method of correcting the chromatic aberration and astigmatism that occur in the image display apparatus according to the first embodiment.

FIG. 8 illustrates an outline of a method of correcting the chromatic aberration and astigmatism that occur in the image display apparatus 1. FIG. 9 illustrates an outline of a method of correcting the field curvature that occurs in the image display apparatus 1. FIGS. 8 and 9 illustrate the second wavelength light $\lambda g2$ as light of a central wavelength, and the first wavelength light $\lambda g1$ and the third wavelength light $\lambda g3$ as light of wavelengths equal to the central wavelength ±1.5 nm. The second wavelength light $\lambda g2$ is light of 517.1 nm, for example. The first wavelength light $\lambda g1$ is light of 518.6 nm, for example. The third wavelength light $\lambda g3$ is light of 515.6 nm, for example.

(Correction of Chromatic Aberration)

The first diffractive section 11 is given a property of causing a chromatic aberration to occur on at least part of light that enters the second diffractive section 12 (e.g., light that forms a central portion of an image), the chromatic aberration being optically symmetrical to that occurring at the second diffractive section 12. Further, as illustrated in FIG. 8, the first diffractive section 11, the relay optical system 20, and the second diffractive section 12 are disposed to correct a chromatic aberration. The relay optical system 20 is an optical system that relays an image resulting from the first diffractive section 11 to the second diffractive section 12. The first diffractive section 11, the relay optical system 20, and the second diffractive section 12 are disposed to allow respective entry angles of light beams as viewed from the first diffractive section 11 and the second diffractive section 12 to be identical with each other. The chromatic aberration is thereby corrected regardless of a position of a beam waist bw.

(Correction of Astigmatism)

Adjusting a shape of a beam (a diameter of the beam, and a divergence angle of the beam) that enters the first diffractive section 11 makes it possible to correct astigmatism. For example, adjusting the position of the beam waist bw in each of the XZ plane and the YZ plane makes it possible to correct astigmatism.

(Correction of Field Curvature)

As illustrated in FIG. 9, an image plane 41 is formed on a side of the first diffractive section 11, and the image plane 42 is formed on a side of the second diffractive section 12. Disposing the first diffractive section 11 and the relay optical system 20 in such a manner as to correct a field curvature occurring on the side of the second diffractive section 12 makes it possible to correct the field curvature on the side of the second diffractive section 12.

1.2. Specific Examples of Image Display Apparatus According to First Embodiment

FIRST SPECIFIC EXAMPLE

FIG. 10 illustrates a configuration of an image display apparatus 1A according to a first specific example of the first embodiment.

The image display apparatus 1A according to the first specific example has a configuration in which the image light formation section 30 includes a plurality of optical devices, and one or more but not all of the plurality of optical devices are disposed between the first diffractive section 11 and the second diffractive section 12.

The image light formation section 30 includes the plurality of optical devices and a light source 34. The image light formation section 30 includes a scanning mirror 31 as the plurality of optical devices.

Further, the image light formation section 30 may include a corrective lens 32 as the plurality of optical devices. The corrective lens 32 is a corrective optical device that corrects astigmatism occurring at the second diffractive section 12. It is possible to dispose the corrective lens 32 at any position between the light source 34 and the scanning mirror 31.

The light source 34 is a laser light source including a laser diode, for example.

The scanning mirror 31 is a scanning optical device that forms image light. The scanning mirror 31 includes, for example, a MEMS (Micro Electro Mechanical Systems) mirror. The scanning mirror 31 generates two-dimensional image light by two-dimensionally scanning laser light from the light source 34 on the basis of image data. A scanning direction and a scanning timing of the scanning mirror 31 are controlled on the basis of the image data.

The scanning mirror 31 is disposed between the first diffractive section 11 and the second diffractive section 12. Further, the scanning mirror 31 is disposed between the first relay lens 21 and the second relay lens 22 in the relay optical system 20. The first relay lens 21 is disposed between the first diffractive section 11 and the scanning mirror 31.

As described above, the image display apparatus 1A according to the first specific example has a configuration in which the scanning mirror 31 as one of the plurality of optical devices is disposed between the first diffractive section 11 and the second diffractive section 12.

In the image display apparatus 1A according to the first specific example, it is possible to correct astigmatism by allowing the corrective lens 32 in the image light formation section 30 to adjust the shape of a beam (the diameter of the beam and the divergence angle of the beam) that enters the first diffractive section 11. For example, it is possible to correct astigmatism by adjusting the position of the beam waist bw in the XZ plane and the YZ plane.

In the image display apparatus 1A according to the first specific example, the first diffractive section 11 has a role of correcting a chromatic aberration, as a portion of an image formation system together with the first relay lens 21 and the second relay lens 22 of the relay optical system 20.

In the image display apparatus 1A according to the first specific example, the second relay lens 22 of the relay optical system 20 has a role of correcting a field curvature at the second diffractive section 12. The second relay lens 22 is desirably disposed at a position and at an angle that allow, as viewed from the second diffractive section 12, light at each angle of view to form an image at an optimum image formation position and allow the image plane 42 to tilt at an optimum angle.

A distance D1 between the second relay lens 22 and the second diffractive section 12 is desirably set to a value at which any light other than the light from the second diffractive section 12 does not enter the field of vision of the viewer. It is desirable that the second relay lens 22 be thereby made invisible from the field of view of the viewer. Further, the distance D1 is desirably set to prevent the viewer's head and the optical system of the image display apparatus 1A from interfering with each other.

The entrance pupil of the image display apparatus 1A according to the first specific example is 0.5 mm, for example. The angle of view is ±20°, for example.

FIGS. 11 to 15 are spot diagrams illustrating an image-forming capability of the image display apparatus 1A according to the first specific example. FIG. 11 illustrates a spot diagram at an angle of view of −20°. FIG. 12 illustrates a spot diagram at an angle of view of −10°. FIG. 13 illustrates a spot diagram at an angle of view of 0°. FIG. 14 illustrates a spot diagram at an angle of view of +10°. FIG. 15 illustrates a spot diagram at an angle of view of +20°. Note that the angle of view herein refers to an angle of view ω in the X direction in FIG. 10. As for the angle of view ω, as illustrated in FIG. 10, an angle of a light beam that enters the eye 100 of the viewer from the left-hand side with respect to the Z-direction axis (the optical axis) is labeled with a − (minus) sign, and an angle of a light beam that enters the eye 100 of the viewer from the right-hand side is labeled with a + (plus) sign. FIGS. 11 to 15 illustrate the spot diagrams of light of a central wavelength (517.1 nm) and light of wavelengths equal to the central wavelength ±1.5 nm in a single wavelength band.

As illustrated in FIGS. 11 to 15, the chromatic aberration is satisfactorily corrected by the image display apparatus 1A according to the first specific example.

Second Specific Example

FIG. 16 illustrates a configuration of an image display apparatus 1B according to a second specific example of the first embodiment.

Relative to the image display apparatus 1A according to the first specific example, the image display apparatus 1B according to the second specific example includes a light guide plate 13 that guides image light outputted from the relay optical system 20 to the second diffractive section 12.

The light guide plate 13 has a first surface 13A and a second surface 13B opposed to each other.

A prism 14 is disposed on the second surface 13B of the light guide plate 13. The prism 14 has a role of causing the image light to enter the light guide plate 13. It is possible for the prism 14 to have a role of adjusting an optical path length for each pixel.

The second diffractive section 12 is disposed on either the first surface 13A or the second surface 13B of the light guide plate. In FIG. 16, the second diffractive section 12 is disposed on the first surface 13A.

The remainder of the configuration may be substantially similar to that of the image display apparatus 1A according to the first specific example.

(Third Specific Example)

FIG. 17 illustrates a configuration of an image display apparatus 1C according to a third specific example of the first embodiment.

Relative to the image display apparatus 1A according to the first specific example, the image display apparatus 1C according to the third specific example has a configuration in which the image light formation section 30 is entirely disposed farther than the first diffractive section 11 and the second diffractive section 12 as viewed from the viewer.

The image display apparatus 1C according to the third specific example includes the scanning mirror 31, the corrective lens 32, and a reflective mirror 33 as the plurality of optical devices.

The reflective mirror 33 has a role of reflecting light from the light source 34 toward the scanning mirror 31.

The image display apparatus 1C according to the third specific example has a configuration in which the scanning mirror 31 is disposed in front of (when viewed from the viewer, farther than) the first diffractive section 11. In the image display apparatus 1C according to the third specific example, the image light enters the first diffractive section 11 after being outputted from the scanning mirror 31.

In the image display apparatus 1C according to the third specific example, the first diffractive section 11 and the second diffractive section 12 include respective diffractive devices that exert optically the same actions, and are symmetrically arranged in the XZ plane, thereby making it possible to correct a chromatic aberration satisfactorily.

The entrance pupil of the image display apparatus 1C according to the third specific example is 0.5 mm, for example. The angle of view is ±20°, for example.

FIG. 18 is a spot diagram illustrating an image-forming capability of the image display apparatus 1C according to the third specific example. FIG. 18 illustrates the spot diagram of light of a central wavelength (517.1 nm) and light of wavelengths equal to the central wavelength ±1.5 nm in a single wavelength band. FIG. 18 illustrates the spot diagrams at angles of view in the range of −20° to +20°. Note that the angles of view herein refer to angles of view $\omega$ in the X direction in FIG. 17. As for the angles of view $\omega$, as illustrated in FIG. 17, an angle of a light beam that enters the eye 100 of the viewer from the left-hand side with respect to the Z-direction axis (the optical axis) is labeled with a − (minus) sign, and an angle of a light beam that enters the eye 100 of the viewer from the right-hand side is labeled with a + (plus) sign.

As illustrated in FIG. 18, the chromatic aberration is satisfactorily corrected by the image display apparatus 1C according to the third specific example.

The remainder of the configuration may be substantially similar to that of the image display apparatus 1A according to the first specific example.

(Fourth Specific Example)

FIG. 19 illustrates a configuration of an image display apparatus 1D according to a fourth specific example of the first embodiment.

Relative to the image display apparatus 1C according to the third specific example, the image display apparatus 1D according to the fourth specific example has a configuration in which a collimator lens 51 is disposed between the image light formation section 30 (the scanning mirror 31) and the first diffractive section 11.

Because the first diffractive section 11 is a device that diffracts parallel light with parallel light, the collimator lens 51 has a role of making image light generated by the scanning mirror 31 into parallel light.

The entrance pupil of the image display apparatus 1D according to the fourth specific example is 0.5 mm, for example. The angle of view is ±20°, for example.

FIG. 20 is a spot diagram illustrating an image-forming capability of the image display apparatus 1D according to the fourth specific example. FIG. 20 illustrates the spot diagram of light of a central wavelength (517.1 nm) and light of wavelengths equal to the central wavelength ±1.5 nm in a single wavelength band. FIG. 20 illustrates the spot diagrams at angles of view in the range of −20° to +20°. Note that the angles of view herein refer to angles of view $\omega$ in the X direction in FIG. 19. As for the angles of view $\omega$, as illustrated in FIG. 19, an angle of a light beam that enters the eye 100 of the viewer from the left-hand side with respect to the Z-direction axis (the optical axis) is labeled with a − (minus) sign, and an angle of a light beam that enters the eye 100 of the viewer from the right-hand side is labeled with a + (plus) sign.

As illustrated in FIG. 20, the chromatic aberration is satisfactorily corrected by the image display apparatus 1D according to the fourth specific example.

The remainder of the configuration may be substantially similar to that of the image display apparatus 1C according to the third specific example.

(Fifth Specific Example)

FIG. 21 illustrates a configuration of an image display apparatus 1E according to a fifth specific example of the first embodiment.

Relative to the image display apparatus 1C according to the third specific example, the image display apparatus 1E according to the fifth specific example includes a relay optical system 20A instead of the relay optical system 20.

In the relay optical system 20 of the image display apparatus 1C according to the third specific example, the first relay lens 21 and the second relay lens 22 constitute an equal-magnification optical system. In contrast to this, in the relay optical system 20A of the image display apparatus 1E according to the fifth specific example, a first relay lens 21A and a second relay lens 22A constitute a magnification optical system.

In the image display apparatus 1E according to the fifth specific example, for example, the image light formation section 30 forms image light having an angle of view of ±20°. The relay optical system 20A magnifies the angle of view to, for example, ±40°. A wider angle of view is thereby achieved.

The remainder of the configuration may be substantially similar to that of the image display apparatus 1C according to the third specific example.

(Sixth Specific Example)

FIG. 22 illustrates a configuration of an image display apparatus 1F according to a sixth specific example of the first embodiment.

Relative to the image display apparatus 1C according to the third specific example, the image display apparatus 1F according to the sixth specific example includes a relay optical system 20B instead of the relay optical system 20.

The relay optical system 20B of the image display apparatus 1F according to the sixth specific example includes, between the first relay lens 21 and the second relay lens 22, a reflective optical device 23 and a reflective optical device 24 that fold an optical path. It is possible to use, for example, reflective mirrors or prisms to configure the reflective optical device 23 and the reflective optical device 24.

According to the image display apparatus 1F of the sixth specific example, it is possible to achieve a reduction in size by folding the optical path using the reflective optical device 23 and the reflective optical device 24. Further, for example, in a case of applying to a head-mounted display, it becomes easy to achieve a configuration that fits around the viewer's face.

The remainder of the configuration may be substantially similar to that of the image display apparatus 1C according to the third specific example.

(Seventh Specific Example)

FIG. 23 illustrates a configuration of an image display apparatus 1G according to a seventh specific example of the first embodiment.

The image display apparatus 1G according to the seventh specific example has a configuration that supports full color display of red (R), green (G), and blue (B), for example.

Relative to the image display apparatus 1C according to the third specific example, the image display apparatus 1G according to the seventh specific example includes a relay optical system 20C instead of the relay optical system 20.

The relay optical system 20C includes a first relay lens 21B and a second relay lens 22B that support full color display. The first relay lens 21B and the second relay lens 22B include respective achromatic lenses to exert actions of correcting aberrations across a plurality of colors.

Further, in the image display apparatus 1G according to the seventh specific example, the first diffractive section 11 and the second diffractive section 12 each have a structure in which a plurality of diffraction patterns are layered, a structure in which a plurality of diffraction patterns are multiplexed, or a structure in which the layered structure and the multiplexed structure are combined with each other to allow pieces of the image light of a plurality of colors different in wavelength band from each other provided for full color display to converge toward the pupil position of the viewer.

The remainder of the configuration may be substantially similar to that of the image display apparatus 1C according to the third specific example.

1.3. Effects

As described above, according to the image display apparatus of the first embodiment, the first diffractive section 11 and the relay optical system 20 correct a chromatic aberration that occurs at the second diffractive section 12. This makes it possible to display a high quality image with less chromatic aberration.

In addition, the image display apparatus according to the first embodiment exerts the following effects.

It is possible to correct a field curvature that occurs at the second diffractive section 12 and to thereby obtain a high quality image.

It is possible to achieve a reduction in size of the optical system by disposing a portion of the image light formation section 30 between the first diffractive section 11 and the second diffractive section 12 (e.g., FIG. 10). Further, it is possible to correct astigmatism that occurs at the second diffractive section 12 and to thereby obtain a high quality image. Further, by adjusting the relay optical system 20A in magnification, it is possible to expand an angle of view of emission from the image light formation section 30 (FIG. 21). Further, by folding the optical system with use of the reflective devices, it is possible to achieve a shape suitable for eyewear (FIG. 22). Further, by adjusting the relay optical system 20 in magnification and the relay lens in focal point distance, it is possible to make the relay optical system 20 smaller in length and to thereby achieve a reduction in size.

It is to be noted that the effects described herein are mere examples and non-limiting, and other effects may also be provided. This also holds true for effects of other subsequent embodiments.

2. Second Embodiment

Next, an image display apparatus according to a second embodiment of the present disclosure will be described. It is to be noted that, in the following, components substantially the same as those of the image display apparatus according to the foregoing first embodiment are denoted with the same reference numerals, and the description thereof is omitted where appropriate.

Relative to the image display apparatus according to the foregoing first embodiment, the image display apparatus according to the second embodiment relates to a configuration example that enables image display in accordance with a movement of the pupil position.

The image display apparatus according to the second embodiment further includes a detector that detects the pupil position of the viewer, and a controller that causes a convergence position of the image light to move to the pupil position of the viewer on the basis of a result of detection by the detector. Specific configuration examples will be described below.

FIRST SPECIFIC EXAMPLE

FIG. 24 illustrates a configuration of an image display apparatus 1H according to a first specific example of the second embodiment.

The image display apparatus 1H according to the first specific example includes a position detector 61 and a drive controller 62.

The position detector 61 is a detector that detects the pupil position of the viewer.

The drive controller 62 is a controller that causes the convergence position of the image light to move to the pupil position of the viewer on the basis of the result of detection by the position detector 61. The drive controller 62 causes the second diffractive section 12 to move in at least one moving direction corresponding to the horizontal direction of the field of view of the viewer, the vertical direction of the field of view of the viewer, or the depth direction of an eyeball of the viewer, and thereby causes the convergence position of the image light to move to the pupil position of the viewer.

In FIG. 24, Lb represents a region of the second diffractive section 12 that is used for one light condensing point; db represents an amount of movement of the second diffractive section 12 (=an amount of movement of the light condensing point); and dc represents an amount of movement in the Z direction of the second diffractive section 12 (=an amount of movement in the Z direction of the light condensing point).

The remainder of the configuration, operations, and effects may be substantially similar to those of the image display apparatus according to the foregoing first embodiment.

SECOND SPECIFIC EXAMPLE

FIG. 25 illustrates a configuration of an image display apparatus 1I according to a second specific example of the second embodiment.

The image display apparatus 1I according to the second specific example includes the position detector 61 and a drive controller 63.

The drive controller 63 is a controller that causes the convergence position of the image light to move to the pupil position of the viewer on the basis of the result of detection by the position detector 61. The drive controller 63 causes the image light formation section 30 (the entire image light formation section 30 or the scanning mirror 31) to move in at least one moving direction corresponding to the horizontal direction of the field of view of the viewer, the vertical direction of the field of view of the viewer, or the depth direction of the eyeball of the viewer, and thereby causes the convergence position of the image light to move to the pupil position of the viewer.

In FIG. 25, da represents an amount of movement of the light condensing point in the image formation section 30.

The remainder of the configuration, operations, and effects may be substantially similar to those of the image display apparatus according to the foregoing first embodiment.

THIRD SPECIFIC EXAMPLE

FIG. 26 illustrates a configuration of an image display apparatus 1J according to a third specific example of the second embodiment.

The image display apparatus 1J according to the third specific example includes the position detector 61 and a drive controller 64. The image display apparatus 1J further includes a movable reflective mirror 35.

The movable reflective mirror 35 is a movable reflective device that allows a disposition angle thereof to be changed to enable movement of the convergence position of the image light. The movable reflective mirror 35 is disposed on the optical path of the image light outputted from the image light formation section 30. The movable reflective mirror 35 is disposed between the image light formation section 30 and the second diffractive section 12.

The drive controller 64 changes, on the basis of the result of detection by the position detector 61, the disposition angle of the movable reflective mirror 35 to thereby cause the convergence position of the image light to move to the pupil position of the viewer.

The remainder of the configuration, operations, and effects may be substantially similar to those of the image display apparatus according to the foregoing first embodiment.

3. Third Embodiment

Next, an image display apparatus according to a third embodiment of the present disclosure will be described. It is to be noted that, in the following, components substantially the same as those of the image display apparatus according to the foregoing first or second embodiment are denoted with the same reference numerals, and the description thereof is omitted where appropriate.

3.1. Outline of Image Display Apparatus According to Third Embodiment

FIG. 27 illustrates an outline of an image display apparatus 1K according to the third embodiment of the present disclosure.

Relative to the image display apparatus 1 according to the first embodiment (FIG. 3), the image display apparatus 1K according to the third embodiment uses a first diffractive device 71 and a second diffractive device 72 to configure the first diffractive section 11. Further, the image display apparatus 1K according to the third embodiment includes a collimator lens 80 on an optical path between the first diffractive device 71 and the second diffractive device 72.

The first diffractive device 71 has the property of correcting a chromatic aberration that occurs at the second diffractive section 12. The first diffractive device 71 is a transmissive diffractive device. The first diffractive device 71 may be a holographic optical element, for example. The first diffractive device 71 may otherwise be a diffraction grating (DOE), for example.

The second diffractive device 72 is disposed on an optical path between the first diffractive device 71 and the second diffractive section 12. The second diffractive device 72 exerts an action of causing the image light outputted from the first diffractive device 71 to converge. The second diffractive device 72 is a transmissive diffractive device. The second diffractive device 72 may be a holographic optical element, for example. The second diffractive device 72 may otherwise be a diffraction grating, for example.

The collimator lens 80 and the second diffractive device 72 constitute a relay optical system 20D that relays the image light exiting the image light formation section 30 from the first diffractive device 71 to the second diffractive section 12. That is, the second diffractive device 72 constitutes a portion of the relay optical system 20D.

In the image display apparatus 1 according to the first embodiment, it is necessary to dispose the first diffractive section 11 at a conjugative position with respect to the second diffractive section 12. In contrast to this, in the image display apparatus 1K according to the third embodiment, the first diffractive section 11 is configured with the first diffractive device 71 and the second diffractive device 72, which makes it unnecessary to dispose the first diffractive device 71 at a conjugative position.

It is necessary for light reflected by the second diffractive section 12 to enter the eyes of the viewer while being in a state in which all wavelengths are in parallel to each other. To this end, it is necessary to appropriately change an angle of light that enters the second diffractive section 12 on a per-wavelength basis. In the image display apparatus 1K according to the third embodiment, the image light from the image light formation section 30 is dispersed by the first diffractive device 71 to cancel out a chromatic aberration that occurs at the second diffractive section 12. FIG. 27 illustrates the first wavelength light $\lambda g1$, the second wavelength light $\lambda g2$, and the third wavelength light $\lambda g3$ as an example of dispersed wavelength components. Angles of these dispersed pieces of light are adjusted by the collimator lens 80 and the second diffractive device 72 to achieve appropriate entry angles with respect to the second diffractive section 12 on a per-wavelength basis.

3.2. Specific Examples of Image Display Apparatus According to Third Embodiment In the following, components substantially the same as those of the image display apparatus 1K illustrated in FIG. 27 are denoted with the same reference numerals, and the description thereof is omitted where appropriate.

FIRST SPECIFIC EXAMPLE

FIG. 28 illustrates a configuration of an image display apparatus 1L according to a first specific example of the third embodiment.

In the image display apparatus 1L according to the first specific example, the image light formation section 30 includes a non-illustrated light source, the scanning mirror 31, the reflective mirror 33, and a lens 36. The lens 36 is a toroidal lens, for example.

Further, in the image display apparatus 1L according to the first specific example, an image formation lens 81 and a prism 82 are disposed on the optical path between the first diffractive device 71 and the second diffractive device 72.

The first diffractive device 71 is disposed on an optical path between the scanning mirror 31 and the image formation lens 82. The second diffractive device 72, the image formation lens 81, and the prism 82 constitute a relay optical system 20E. In the image display apparatus 1L according to the first specific example, each of the first diffractive device 71 and the second diffractive device 72 is a transmissive diffractive device.

SECOND SPECIFIC EXAMPLE

FIG. 29 illustrates a configuration of an image display apparatus 1M according to a second specific example of the third embodiment.

Relative to the configuration of the image display apparatus 1L according to the first specific example illustrated in FIG. 28, a configuration is also possible in which the first diffractive device 71 is a transmissive diffractive device and the second diffractive device 72 is a reflective diffractive device, as illustrated in FIG. 29. The remainder of the configuration may be substantially similar to that of the image display apparatus 1L according to the first specific example illustrated in FIG. 28.

THIRD SPECIFIC EXAMPLE

FIG. 30 illustrates a configuration of an image display apparatus 1N according to a third specific example of the third embodiment.

Relative to the configuration of the image display apparatus 1L according to the first specific example illustrated in FIG. 28, a configuration is also possible in which the first diffractive device 71 is disposed in front of the scanning mirror 31 in the image light formation section 30, as illustrated in FIG. 30. The remainder of the configuration may be substantially similar to that of the image display apparatus 1L according to the first specific example illustrated in FIG. 28.

FOURTH SPECIFIC EXAMPLE

FIG. 31 illustrates a configuration of an image display apparatus 1O according to a fourth specific example of the third embodiment.

Relative to the configuration of the image display apparatus 1L according to the first specific example illustrated in FIG. 28, a configuration using a spherical mirror optical system is also possible. For example, as illustrated in FIG. 31, a configuration using a plurality of concave mirrors 83A, 83B, and 83C is also possible. In the image display apparatus 1O according to the fourth specific example, the first diffractive device 71 is disposed on an optical path between the non-illustrated light source and the scanning mirror 31. In the image display apparatus 1O according to the fourth specific example, the first diffractive device 71 is a reflective diffractive device, and the second diffractive device 72 is a transmissive diffractive device. Further, in the image display apparatus 1O according to the fourth specific example, the plurality of concave mirrors 83A, 83B, and 83C is disposed on an optical path between the scanning mirror 31 and the second diffractive device 72. The second diffractive device 72 and the plurality of concave mirrors 83A, 83B, and 83C constitute a relay optical system 20F.

3.3. Modification Example of Image Display Apparatus According to Third Embodiment FIG. 32 illustrates an outline of an image display apparatus 1P according to a modification example of the image display apparatus 1K according to the third embodiment illustrated in FIG. 27.

In a technique according to the present disclosure, it is possible to configure the first diffractive section 11 with three or more diffractive devices. FIG. 32 illustrates an example in which the first diffractive section 11 is configured with the first diffractive device 71, the second diffractive device 72, and a third diffractive device 73. The first to third diffractive devices 71 to 73 are transmissive diffractive devices. The first to third diffractive devices 71 to 73 may be holographic optical elements, for example.

In the image display apparatus 1P according to the modification example, as illustrated in FIG. 32, the second diffractive device 72 and the third diffractive device 73 exert an action of causing the image light outputted from the first diffractive device 71 to converge.

3.4. Effects

As described above, according to the image display apparatus of the third embodiment, the first diffractive section 11 is configured with a plurality of diffractive devices. This makes it possible to reduce chromatic aberrations while providing design flexibility, and to further improve image grade. The image display apparatus according to the third embodiment increases optical design flexibility and therefore makes it possible to achieve size reduction of the optical systems.

The remainder of the configuration, operations, and effects may be substantially similar to those of the image display apparatus according to the foregoing first or second embodiment.

4. Other Embodiments

A technique according to the present disclosure is not limited to the description of each of the above embodiments, and may be modified in a variety of ways.

For example, a plurality of the second diffractive sections 12 may be provided relative to the configuration of the image display apparatus 1B illustrated in FIG. 16. For example, a plurality of the second diffractive sections 12 for different wavelength bands may be provided. For example, the second diffractive section 12 for red-color display may be disposed on one of the first surface 13A and the second surface 13B of the light guide plate 13, and the second diffractive sections 12 for green- and blue-color display may be disposed on the other of the first surface 13A and the second surface 13B.

Further, a technique according to the present disclosure is applicable not only to a head-mounted display but also to a projector, for example.

For example, the present technology may be configured as follows.

According to the present technology with the following configuration, the first diffractive section and the relay optical system correct a chromatic aberration that occurs at the second diffractive section. This makes it possible to display a high quality image with less chromatic aberration.

(1)
An image display apparatus including:
an image light formation section that outputs image light;
a diffractive optical system that includes a first diffractive section including at least one diffractive device and a second diffractive section causing the image light to converge at a pupil position of a viewer, the first diffractive section having a property of correcting a chromatic aberration that occurs at the second diffractive section; and
a relay optical system disposed closer to the image light formation section than the second diffractive section and relaying the image light to the second diffractive section to correct the chromatic aberration that occurs at the second diffractive section.

(2)
The image display apparatus according to (1), in which the first diffractive section has a property of causing a chromatic aberration to occur on at least part of light that enters the second diffractive section, the chromatic aberration being optically symmetrical to that occurring at the second diffractive section.

(3)
The image display apparatus according to (1) or (2), in which the image light formation section includes a plurality of optical devices, and one or more but not all of the plurality of optical devices are disposed between the first diffractive section and the second diffractive section.

(4)
The image display apparatus according to (3), in which the image light formation section includes, as the plurality of optical devices, a scanning optical device that forms the image light, the scanning optical device being disposed between the first diffractive section and the second diffractive section.

(5)
The image display apparatus according to (1) or (2), in which the image light formation section is entirely disposed farther than the first diffractive section and the second diffractive section as viewed from the viewer.

(6)
The image display apparatus according to any one of (1) to (5), in which the image light formation section includes a corrective optical device that corrects astigmatism occurring at the second diffractive section.

(7)
The image display apparatus according to any one of (1) to (6), in which the first diffractive section and the second diffractive section each have a structure in which a plurality of diffraction patterns are layered, a structure in which a plurality of diffraction patterns are multiplexed, or a structure in which the layered structure and the multiplexed structure are combined with each other to allow a plurality of pieces of the image light that are different in wavelength band from each other to converge toward the pupil position of the viewer.

(8)
The image display apparatus according to any one of (1) to (7), further including:
a detector that detects the pupil position of the viewer; and
a controller that causes, on a basis of a result of detection by the detector, the second diffractive section to move in at least one moving direction corresponding to a horizontal direction of a field of view of the viewer, a vertical direction of the field of view of the viewer, or a depth direction of an eyeball of the viewer, and thereby causes a convergence position of the image light to move to the pupil position of the viewer.

(9)
The image display apparatus according to any one of (1) to (7), further including:
a detector that detects the pupil position of the viewer; and
a controller that causes, on a basis of a result of detection by the detector, the image light formation section to move in at least one moving direction corresponding to a horizontal direction of a field of view of the viewer, a vertical direction of the field of view of the viewer, or a depth direction of an eyeball of the viewer, and thereby causes a convergence position of the image light to move to the pupil position of the viewer.

(10)
The image display apparatus according to any one of (1) to (9), in which the image light formation section includes
a light source, and
a scanning optical device that forms the image light by scanning a flux of light emitted from the light source.

(11)
The image display apparatus according to any one of (1) to (10), further including a movable reflective device that allows a disposition angle thereof to be changed to enable movement of a convergence position of the image light.

(12)
The image display apparatus according to (11), further including:
a detector that detects the pupil position of the viewer; and
a controller that changes, on a basis of a result of detection by the detector, the disposition angle of the movable reflective device, and thereby causes the convergence position of the image light to move to the pupil position of the viewer.

(13)
The image display apparatus according to (11) or (12), in which the movable reflective device is disposed on an optical path of the image light outputted from the image light formation section.

(14)
The image display apparatus according to (13), in which the movable reflective device is disposed between the image light formation section and the second diffractive section.

(15)
The image display apparatus according to any one of (1) to (14), further including a light guide plate that guides the image light outputted from the relay optical system to the second diffractive section.

(16)
The image display apparatus according to (15), in which
the light guide plate has a first surface and a second surface opposed to each other, and
the second diffractive section is disposed on the first surface, the second surface, or both, of the light guide plate.

(17)
The image display apparatus according to (1) or (2), in which the first diffractive section includes
a first diffractive device having the property of correcting the chromatic aberration that occurs at the second diffractive section, and
a second diffractive device disposed on an optical path between the first diffractive device and the second diffractive section and causing the image light outputted from the first diffractive device to converge.

(18)
The image display apparatus according to (17), in which the second diffractive device constitutes a portion of the relay optical system.

(19)

The image display apparatus according to (17) or (18), in which the first diffractive device is a transmissive diffractive device, and the second diffractive device is a transmissive or reflective diffractive device.

(20)

The image display apparatus according to (17) or (18), in which the first diffractive device is a reflective diffractive device, and the second diffractive device is a transmissive or reflective diffractive device.

This application claims priority from Japanese Patent Application No. 2018-110305 filed with the Japan Patent Office on Jun. 8, 2018 and Japanese Patent Application No. 2019-87456 filed with the Japan Patent Office on May 7, 2019, the entire contents of each of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image display apparatus comprising:
an image light formation section that outputs image light;
a diffractive optical system that includes a first diffractive section including at least one diffractive device and a second diffractive section causing the image light to converge at a pupil position of a viewer, the first diffractive section having a property of correcting a chromatic aberration that occurs at the second diffractive section;
a relay optical system disposed closer to the image light formation section than to the second diffractive section, and relaying the image light to the second diffractive section to correct the chromatic aberration that occurs at the second diffractive section; and
a light guide plate that guides the image light outputted from the relay optical system to the second diffractive section, wherein
the light guide plate has a first surface and a second surface opposed to each other, and
the second diffractive section is disposed on the first surface, the second surface, or both, of the light guide plate.

2. The image display apparatus according to claim 1, wherein the first diffractive section has a property of causing a chromatic aberration to occur on at least part of light that enters the second diffractive section, the chromatic aberration being optically symmetrical to that occurring at the second diffractive section.

3. The image display apparatus according to claim 1, wherein the image light formation section includes a plurality of optical devices, and one or more but not all of the plurality of optical devices are disposed between the first diffractive section and the second diffractive section.

4. The image display apparatus according to claim 3, wherein the image light formation section includes, as the plurality of optical devices, a scanning optical device that forms the image light, the scanning optical device being disposed between the first diffractive section and the second diffractive section.

5. The image display apparatus according to claim 1, wherein the image light formation section is entirely disposed farther than the first diffractive section and the second diffractive section as viewed from the viewer.

6. The image display apparatus according to claim 1, wherein the image light formation section includes a corrective optical device that corrects astigmatism occurring at the second diffractive section.

7. The image display apparatus according to claim 1, wherein the first diffractive section and the second diffractive section each have a structure in which a plurality of diffraction patterns are layered, a structure in which a plurality of diffraction patterns are multiplexed, or a structure in which the layered structure and the multiplexed structure are combined with each other to allow a plurality of pieces of the image light that are different in wavelength band from each other to converge toward the pupil position of the viewer.

8. The image display apparatus according to claim 1, further comprising:
a detector that detects the pupil position of the viewer; and
a controller that causes, on a basis of a result of detection by the detector, the second diffractive section to move in at least one moving direction corresponding to a horizontal direction of a field of view of the viewer, a vertical direction of the field of view of the viewer, or a depth direction of an eyeball of the viewer, and thereby causes a convergence position of the image light to move to the pupil position of the viewer.

9. The image display apparatus according to claim 1, further comprising:
a detector that detects the pupil position of the viewer; and
a controller that causes, on a basis of a result of detection by the detector, the image light formation section to move in at least one moving direction corresponding to a horizontal direction of a field of view of the viewer, a vertical direction of the field of view of the viewer, or a depth direction of an eyeball of the viewer, and thereby causes a convergence position of the image light to move to the pupil position of the viewer.

10. The image display apparatus according to claim 1, wherein the image light formation section includes
a light source, and
a scanning optical device that forms the image light by scanning a flux of light emitted from the light source.

11. The image display apparatus according to claim 1, further comprising a movable reflective device that allows a disposition angle thereof to be changed to enable movement of a convergence position of the image light.

12. The image display apparatus according to claim 11, further comprising:
a detector that detects the pupil position of the viewer; and
a controller that changes, on a basis of a result of detection by the detector, the disposition angle of the movable reflective device, and thereby causes the convergence position of the image light to move to the pupil position of the viewer.

13. The image display apparatus according to claim 11, wherein the movable reflective device is disposed on an optical path of the image light outputted from the image light formation section.

14. The image display apparatus according to claim 13, wherein the movable reflective device is disposed between the image light formation section and the second diffractive section.

15. An image display apparatus comprising:
an image light formation section that outputs image light;
a diffractive optical system that includes a first diffractive section including at least one diffractive device and a second diffractive section causing the image light to converge at a pupil position of a viewer, the first diffractive section having a property of correcting a chromatic aberration that occurs at the second diffractive section; and a relay optical system disposed closer to the image light formation section than to the second diffractive section and relaying the image light to the second diffractive section to correct the chromatic aberration that occurs at the second diffractive section, wherein the first diffractive section includes a first diffractive device having the property of correcting the chromatic aberration that occurs at the second diffractive section, and a second diffractive device disposed on an optical path between the first diffractive device and the second diffractive section and causing the image light outputted from the first diffractive device to converge.

16. The image display apparatus according to claim 15, wherein the second diffractive device constitutes a portion of the relay optical system.

17. The image display apparatus according to claim 15, wherein the first diffractive device is a transmissive diffractive device, and the second diffractive device is a transmissive or reflective diffractive device.

18. The image display apparatus according to claim 15, wherein the first diffractive device is a reflective diffractive device, and the second diffractive device is a transmissive or reflective diffractive device.

19. The image display apparatus according to claim 1, further comprising a prism.

20. The image display apparatus according to claim 1, wherein the second diffractive section is disposed on the first surface of the light guide plate, and the prism is disposed on the second surface of the light guide plate.

* * * * *